(12) United States Patent
Bae et al.

(10) Patent No.: US 9,444,919 B2
(45) Date of Patent: Sep. 13, 2016

(54) ELECTRONIC DEVICE INCLUDING REMOVABLE COMPONENT

(71) Applicant: Samsung Electronics Co., Ltd., Gyeonggi-do (KR)

(72) Inventors: Seung-Jae Bae, Gyeonggi-do (KR); Jae-Il Seo, Gyeonggi-do (KR); Hong-Moon Chun, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/464,955

(22) Filed: Aug. 21, 2014

(65) Prior Publication Data
US 2015/0062844 A1   Mar. 5, 2015

(30) Foreign Application Priority Data

Sep. 2, 2013 (KR) .................. 10-2013-0104846

(51) Int. Cl.
*G06F 1/16* (2006.01)
*H04M 1/02* (2006.01)

(52) U.S. Cl.
CPC .................................. *H04M 1/0249* (2013.01)

(58) Field of Classification Search
CPC ... G06F 1/1601; G06F 1/1603; H05K 1/188; H01L 23/3735
USPC ............... 248/534, 157, 522, 284.1, 123.11, 248/503.1, 218.4; 310/313 R; 257/691, 432, 257/787, 711, 713, 507, 679, 192; 174/261, 174/527, 255, 773, 260, 262, 135, 521, 259, 174/535, 550, 250; 361/679.09, 679.01, 361/679.41, 679.31, 679.47, 679.54, 361/679.21, 679.39, 679.26; 312/223.1, 312/223.2, 351.11, 249.8; 165/185, 80.3, 165/80.2, 104.33, 80.4, 905; 345/1.3, 173, 345/55, 205
See application file for complete search history.

(56) References Cited

U.S. PATENT DOCUMENTS

| | | | |
|---|---|---|---|
| 8,736,149 B2* | 5/2014 | Inoue | H01L 23/315 310/313 R |
| 2007/0235218 A1* | 10/2007 | Miyamoto | H01L 21/4857 174/261 |
| 2008/0006928 A1* | 1/2008 | Miyazaki | H01L 23/49822 257/691 |
| 2008/0167073 A1 | 7/2008 | Hobson et al. | |
| 2009/0175013 A1 | 7/2009 | Hamilton et al. | |
| 2011/0133997 A1 | 6/2011 | Lee | |

(Continued)

FOREIGN PATENT DOCUMENTS

| | | |
|---|---|---|
| KR | 10-2011-0064815 A | 6/2011 |
| KR | 10-2013-0033399 A | 3/2013 |
| KR | 10-2013-0071173 A | 6/2013 |

OTHER PUBLICATIONS

LG Optimus Vu Tear Down Repair Guide, Mar. 2012, pp. 1-7 http://www.repairuniverse.com/lg-optimus-vu-take-apart-repair-guide.html.

*Primary Examiner* — Hung Duong
(74) *Attorney, Agent, or Firm* — Cha & Reiter, LLC.

(57) ABSTRACT

An electronic device is provided, including a mounting plate, a first component and a second component disposed on the mounting plate, a substrate disposed on the mounting plate and having a portion disposed between the first component and the second component, and a third component disposed on the mounting plate and electrically coupled to the substrate.

21 Claims, 15 Drawing Sheets

(56) References Cited

U.S. PATENT DOCUMENTS

| | | |
|---|---|---|
| 2013/0156233 A1 | 6/2013 | Joo |
| 2013/0223836 A1 | 8/2013 | Gibbs et al. |
| 2014/0292730 A1 | 10/2014 | Yoon et al. |
| 2015/0223343 A1* | 8/2015 | Yamaki ............... H05K 1/188 361/761 |
| 2015/0342074 A1* | 11/2015 | Sunaga ............ H01L 23/3735 361/728 |

* cited by examiner

ELECTRONIC DEVICE INCLUDING REMOVABLE COMPONENT

CROSS REFERENCE TO RELATED APPLICATION

This application claims priority under 35 U.S.C. §119 to an application filed in the Korean Intellectual Property Office on Sep. 2, 2013 and assigned Serial No. 10-2013-0104846, the contents of which are incorporated herein by reference.

TECHNICAL FIELD

The present disclosure relates generally to an electronic device, and, more particularly, to an electronic device configured to provide particular spaces for receiving a plurality of electronic components.

BACKGROUND

With the development of current electronic communication industries, electronic devices such as cellular phones, an electronic organizers, and laptop computers have become necessities of modern society, and an important means for delivering rapidly changing information. Users operate these devices conveniently through Graphical User Interface (GUI) environments implemented on a touch screen, and provides a variety of information, network access and multimedia.

In order to provide the various functions, a user device includes various electronic components. For example, a user device with a stylus provides a writing or drawing function. Similarly, a user device with a stereo speaker module provides a music listening function using stereo sound. Furthermore, a user device with a camera module provides a picture capturing function. Finally, a user device with a communication module provides a communication function for communicating with another electronic device via a network.

SUMMARY

The present disclosure provides an electronic device including a plurality of components for various functions and having a slim appearance.

According to an aspect of the present invention, an electronic device includes a mounting plate, a first component and a second component disposed on the mounting plate, a substrate disposed on the mounting plate and having a portion disposed between the first component and the second component, and a third component disposed on the mounting plate and electrically coupled to the substrate.

BRIEF DESCRIPTION OF THE DRAWINGS

The present disclosure will become more apparent from the following detailed description when taken in conjunction with the accompanying drawings in which.

DETAILED DESCRIPTION

Figure 1:
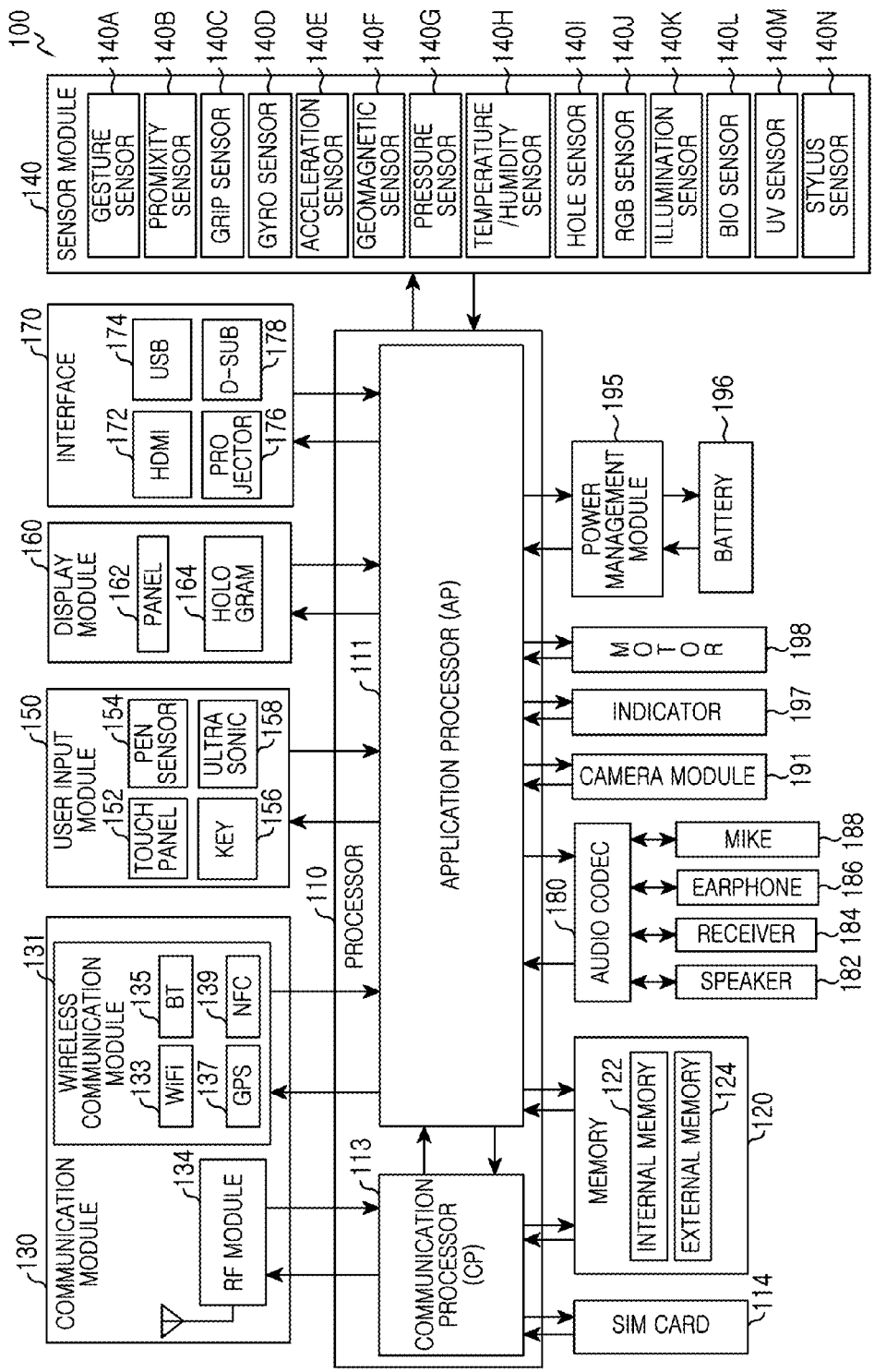
FIG. 1 is a block diagram illustrating hardware according to an embodiment of the present disclosure.

Hereinafter, embodiments of the present disclosure will be described in more detail with reference to the accompanying drawings. In relation to the present disclosure, example embodiments are illustrated in drawings, related detailed descriptions are listed and, as various modifications are possible, various embodiments are thus provided. Accordingly, the present disclosure is not intended to be limited to the specific embodiments, and it is understood that it should include all modifications, equivalents, and substitutes within the technical ambit of the present disclosure. With respect to the descriptions of the drawings, like reference numerals refer to like elements.

An electronic device according to an embodiment of the present disclosure may be a device having a communication function. For example, an electronic device may be for example one of a smartphone, tablet personal computer (PCs), mobile phone, video phone, e-book reader, desktop PC, personal digital assistant (PDA), portable multimedia player (PMPs), MP3 player, mobile medical equipment, camera, or wearable device (for example, head-mounted-devices or "HMDs," such as electronic glasses, electronic clothing, electronic bracelets, electronic necklaces, accessories, or smartwatches).

According to an embodiment of the present disclosure, an electronic device may be smart home appliance having a communication function. Smart home appliance, for example, an electronic device, may include at least one of digital video disk (DVD) players, audios, refrigerators, air conditioners, vacuum cleaners, ovens, microwaves, washing machines, air purifiers, set-top boxes, TV boxes (for example, the Samsung HomeSync™, Apple TV™, or Google TV™), game consoles, electronic dictionaries, camcorders, or electronic frames.

According to an embodiment of the present disclosure, an electronic device may include at least one of various medical devices (such as, for example, magnetic resonance angiography "MRA" devices, magnetic resonance imaging "MRI" devices, computed tomography "CT" devices, medical imaging devices, ultrasonic devices, etc.), navigation devices, global positioning system "GPS" receivers, event data recorders "EDRs", flight data recorders "FDRs", vehicle infotainment devices, marine electronic equipment (for example, marine navigation systems, gyro compasses, etc.), avionics, or security equipment.

According to an embodiment of the present disclosure, an electronic device may include at least one of furniture or buildings/structures having a communication function, electronic boards, electronic signature receiving devices, projectors, or various measuring instruments (such as water, electricity, gas, or radio signal measuring instruments). An electronic device according to an embodiment of the present disclosure may be one of the above-mentioned various devices or a combination thereof. Furthermore, it is apparent to those skilled in the art that an electronic device according to an embodiment of the present disclosure is not limited to the above-mentioned devices.

FIG. 1 is a block diagram illustrating hardware according to an embodiment of the present disclosure.

Referring to FIG. 1, the hardware 100 includes at least one processor 110, a subscriber identification module (SIM) card 114, a memory 120, a communication module 130, a sensor module 140, a user input module 150, a display module 160, an interface 170, an audio codec 180, a camera module 191, a power management module 195, a battery 196, an indicator 197, and a motor 198.

The processor 110 may include at least one application processor (AP) 111 or at least one communication processor (CP) 113. Although the AP 111 and the CP 113 included in the processor 110 are shown in FIG. 1, they may be included in different IC packages. The AP 111 and the CP 113 may be included in one IC package.

The AP 111 may control a plurality of hardware or software components connected to the AP 111 by executing an operating system or an application program and may perform various data processing and operations with multimedia data. The AP 111 may be implemented with a system on chip (SoC), for example. The processor 110 may further include a graphic processing unit (GPU) (not shown).

The CP 113 may manage a data link during communication between the hardware 100 and other hardware connected via a network and may convert a communication protocol. The CP 113 may be implemented with a SoC, for example. The CP 113 may perform at least part of a multimedia control function. The CP 113 may perform a distinction and authentication of a terminal in a communication network by using a subscriber identification module (for example, the SIM card 114), for example. The CP 113 may provide services, for example, a voice call, a video call, a text message, or packet data, to a user.

Additionally, the CP 113 may control the data transmission of the communication module 130. As shown in FIG. 1, components such as the CP 113, the power management module 195, or the memory 120 are separated from the AP 111, but according to an embodiment of the present disclosure, the AP 111 may be implemented including some of the above-mentioned components (for example, the CP 113).

The AP 111 or the CP 113 may load instructions or data, which are received from a nonvolatile memory connected to each or at least one of other components, into a volatile memory and may process them. The AP 111 or the CP 113 may store data received from or generated by at least one of other components in a nonvolatile memory.

The SIM card 114 may be a card implementing a subscriber identification module and may be inserted into a slot formed at a specific position of the hardware 100. The SIM card 114 may include unique identification information (for example, an integrated circuit card identifier "ICCID") or subscriber information (such as, for example, an international mobile subscriber identity "IMSI").

The memory 120 may include an internal memory 122 or an external memory 124. The internal memory 122 may include at least one of a volatile memory (for example, dynamic RAM "DRAM", static RAM "SRAM", synchronous dynamic RAM "SDRAM") and a non-volatile memory (for example, one time programmable ROM "OTPROM", programmable ROM "PROM", erasable and programmable ROM "EPROM", electrically erasable and programmable ROM "EEPROM", mask ROM, flash ROM, NAND flash memory, and NOR flash memory). The internal memory 122 may have a form of Solid State Drive "SSD". The external memory 124 may further include compact flash (CF), secure digital (SD), micro secure digital (Micro-SD), mini secure digital (Mini-SD), extreme digital (xD), or a memory stick.

The communication module 130 may include a wireless communication module 131 or an RF module 134. The wireless communication module 131 may include a WiFi 133, a Bluetooth (BT) 135, a GPS 137, or a near field communication (NFC) 139. For example, the wireless communication module 131 may provide a wireless communication function by using a wireless frequency. Additionally or alternatively, the wireless communication module 131 may include a network interface (for example, a LAN card) or a modem for connecting the hardware 100 to a network (for example, Internet, local area network (LAN), wire area network (WAN), telecommunication network, cellular network, satellite network, or plain old telephone service (POTS)).

The RF module 134 may be responsible for data transmission, for example, the transmission of an RF signal or a called electrical signal. Although not shown in the drawings, the RF module 134 may include a transceiver, a power amp module (PAM), a frequency filter, or a low noise amplifier (LNA). The RF module 134 may further include components for transmitting/receiving electromagnetic waves on free space in a wireless communication, for example, conductors or conducting wires.

The sensor module 140 may include at least one of a gesture sensor 140A, a proximity sensor 140B, a grip sensor 140C, a gyro sensor 140D, an acceleration sensor 140E, a geomagnetic sensor 140F, a pressure sensor 140G, a temperature/humidity sensor 140H, a hole sensor 140I, a red, green, blue (RGB) sensor 140J, an illumination sensor 140K, a bio sensor 140L, a ultra violet (UV) sensor 140M, or a stylus detector 140N. The sensor module 140 measures physical quantities or detects an operating state of hardware, thereby converting the measured or detected information into electrical signals. Additionally/alternately, the sensor module 140 may include an E-nose sensor (not shown), an electromyography (EMG) sensor, an electroencephalogram (EEG) sensor (not shown), or an electrocardiogram (ECG) sensor (not shown). The sensor module 140 may further include a control circuit for controlling at least one sensor therein.

The user input module 150 may include a touch panel 152, a (digital) pen sensor (for example, a digitizer) 154, a key 156, or an ultrasonic input device 158. The touch panel 152 may recognize a touch input through at least one of a capacitive, resistive, infrared, or ultrasonic method, for example. The touch panel 152 may further include a controller (not shown). In the case of the capacitive method, both direct touch and proximity recognition are possible. The touch panel 152 may further include a tactile layer and may provide tactile reaction to a user.

The (digital) pen sensor 154 may be implemented through a method similar or identical to that of receiving a user's touch input, for example, a capacitive, resistive, infrared, or ultrasonic method, or an additional sheet for recognition. A keypad or a touch key may be used as the key 156, for example. The ultrasonic input device 158, as a device confirming data by detecting sound waves through a mike in a terminal, may provide wireless recognition through a pen generating ultrasonic signals. The hardware 100 may receive a user input from an external device (for example, a network, a computer, or a server) connected thereto through the communication module 130.

The display module 160 may include a panel 162 or a hologram 164. The panel 162 may include a liquid-crystal display (LCD) or an active-matrix organic light-emitting diode (AM-OLED). The panel 162 may be implemented to be flexible, transparent, or wearable, for example. The panel 162 and the touch panel 152 may be configured with one module. The hologram 164 may show three-dimensional images in the air by using the interference of light. The display module 160 may further include a control circuit for controlling the panel 162 or the hologram 164.

The interface 170 may include a high-definition multimedia interface (HDMI) 172, a universal serial bus (USB) 174, a projector 176, or a D-subminiature (sub) 178. Additionally/alternately, the interface 170 may include a secure Digital (SD)/multi-media card (MMC) (not shown) or infrared data association (IrDA) (not shown).

The audio codec 180 may convert voice and electrical signals in both directions. The audio codec 180 may convert voice information inputted or outputted through a speaker 182, a receiver 184, an earphone 186, or a microphone "mike" 188.

The camera unit 191, as a device for capturing an image and video, may include at least one image sensor (for example, a front lens or a rear lens), an image signal processor (ISP) (not shown), or a flash LED (not shown).

The power management module 195 may manage the power of the hardware 100. Although not shown in the drawings, the power management module 195 may include a power management integrated circuit (PMIC), a charger integrated circuit (IC), or a battery fuel gauge.

The PMIC may be built in an IC or SoC semiconductor, for example. A charging method may be classified as a wired method and a wireless method. The charger IC may charge a battery and may prevent overvoltage or overcurrent flow from a charger. The charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

A battery gauge may measure the remaining amount of charge of the battery 196, or a voltage, current, or temperature thereof during charging. The battery 196 may generate electricity and supply power. For example, the battery 196 may be a rechargeable battery.

The indicator 197 may display a specific state of the hardware 100 or part thereof (for example, the AP 111), for example, a booting state, a message state, or a charging state. The motor 198 may convert electrical signals into mechanical vibration. An MCU (not shown) may control the sensor module 140.

Although not shown in the drawings, the hardware 100 may include a processing device (for example, a GPU) for mobile TV support. A processing device for mobile TV support may process media data according to the standards such as digital multimedia broadcasting (DMB), digital video broadcasting (DVB), or media flow.

The names of the above-mentioned components in hardware according to an embodiment of the present disclosure may vary according to types of hardware. Hardware according to an embodiment of the present disclosure may be configured including at least one of the above-mentioned components or additional other components. Some components in hardware according to an embodiment of the present disclosure are configured as one entity, so that functions of previous corresponding components are performed identically.

Figure 2:
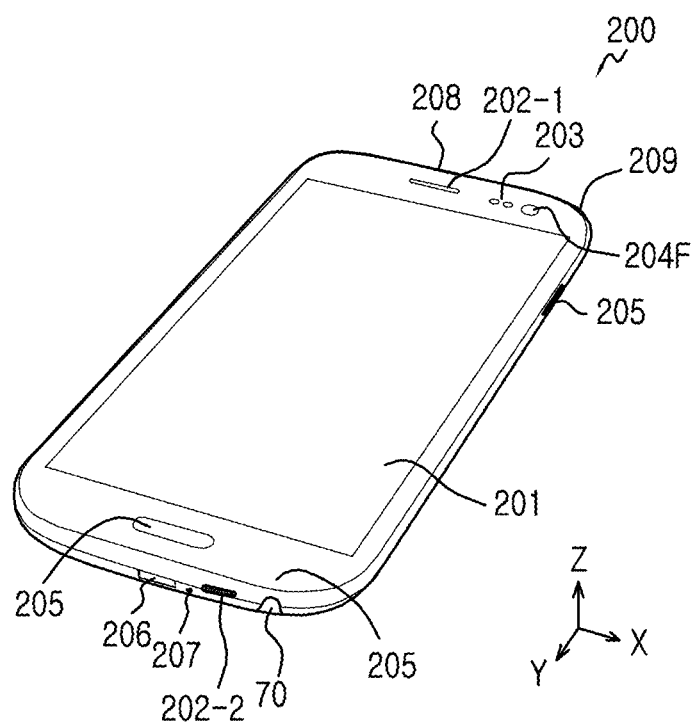
FIG. 2 is a perspective view of an electronic device according to an embodiment of the present disclosure.

FIG. 2 is a perspective view of an electronic device according to an embodiment of the present disclosure. The electronic device 200 may be the hardware shown in FIG. 1. Referring to FIG. 2, the electronic device 200 may include a touch screen 201, a front speaker 202-1, a side speaker 202-2, at least one sensor 203, a front camera 204F, at last one key 205, an external port 206, a microphone 207, a jack 208, an antenna 209, or a stylus (depicted as 70 in FIGS. 8, 14 and 15).

The touch screen 201 may display an image and may receive a touch input. The touch screen 201 may include a display 160, a touch panel 152, and a pen sensor (for example, a digitizer) 154.

The front speaker 202-1 and/or the side speaker 202-2 (for example, the speaker 182) may output electrical signal as sound.

At least one sensor 203 (for example, the sensor module 140) measures physical quantities or detects an operating state of the electronic device 200, thereby converting the measured or detected information into electrical signals. The at least one sensor 203 may be disposed at a specific position. The at least one sensor 203 may include at least one of a gesture sensor, a proximity sensor, a grip sensor, a gyro sensor, an acceleration sensor, a geomagnetic sensor, a pressure sensor, a temperature/humidity sensor, a hole sensor, a red, green, and blue (RGB) sensor, an illumination sensor, a bio sensor, a ultra violet (UV) sensor, or a stylus detector.

The camera 204F (for example, the camera module 291), as a device for capturing an image and video, may include at least one image sensor (for example, a front lens or a rear lens), an image signal processor (ISP) (not shown), or a flash LED (not shown).

The key 205 (for example, the key 156) may include a press key or a touch key. The key 205 may include a key for adjusting volume or a key for turning on/of power.

The external port 206 (for example, the interface 170) may be used as a port to be connected to a high-definition multimedia interface (HDMI), a universal serial bus (USB), a projector, or a D-subminiature (sub) cable or used as a port for charging.

The microphone 207 (for example, the mike 188) may convert sound into electrical signals.

The jack 208 may allow a plug of an earphone (for example, the earphone 186) or an earset to access electrically. The jack 208 may be covered when not in use.

The antenna 209 (for example, a Digital Multimedia Broadcasting "DMB" antenna) may be taken out to the outside of the electronic device 200 and extend.

The stylus (not depicted) may be taken out to the outside of the electronic device 200. The at least one sensor 203 (for example, the acceleration sensor 140E or the stylus detector 140N) may detect the removal of the stylus. The pen sensor 154 (for example, a digitizer) may read changes in an electric field as the stylus 70 approaches.

Figure 3:
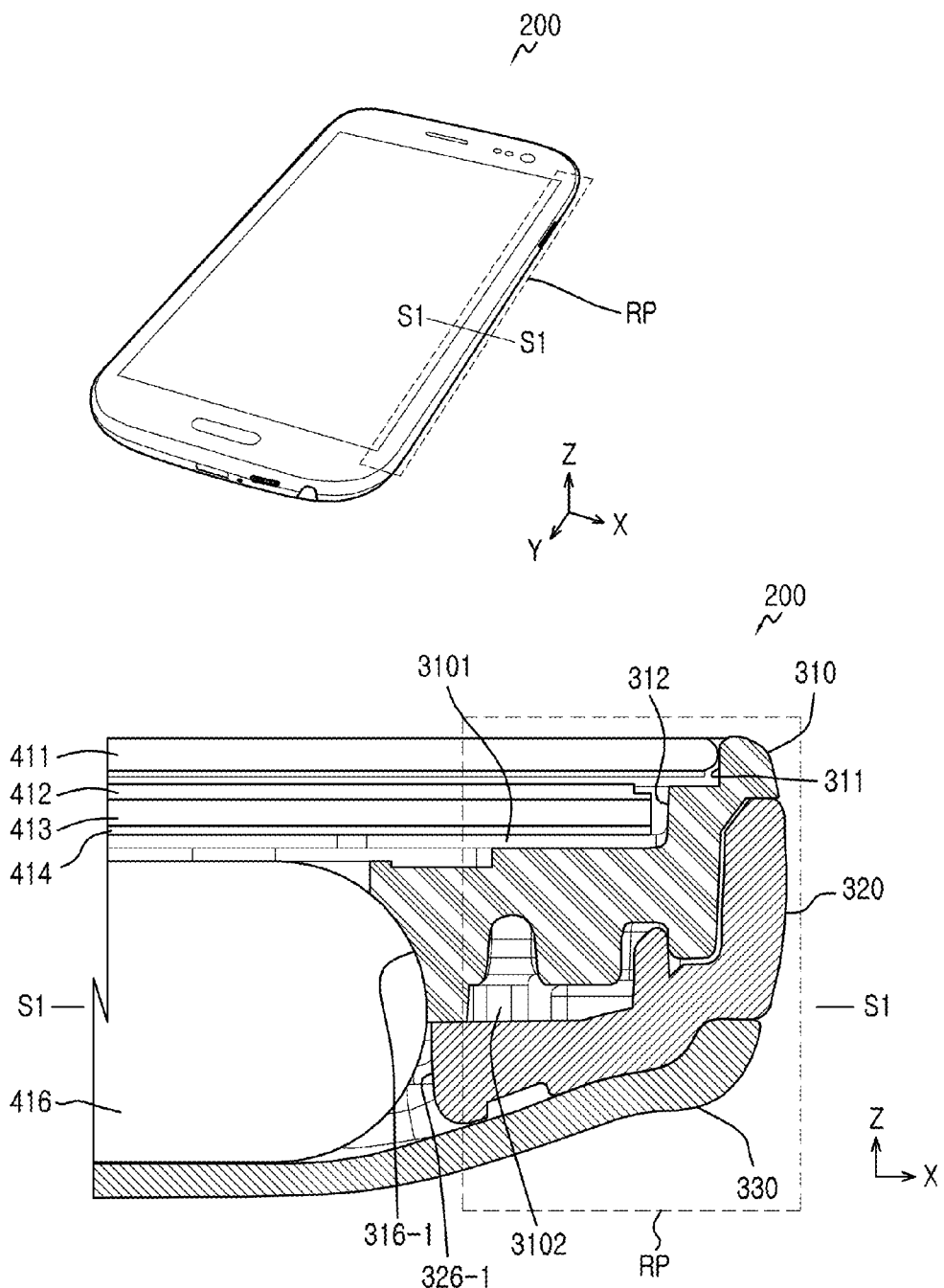
FIG. 3 is a partial sectional view corresponding to a portion S1-S1 of an electronic device according to an embodiment of the present disclosure.

FIG. 3 is a partial sectional view corresponding to a portion S1-S1 of an electronic device according to an embodiment of the present disclosure. The portion S1-S1 may be included in the right border RP of the electronic device 200. Referring to FIG. 3, a window 411, a touch panel 412, a display panel 413, a digitizer 414, a battery 416, a bracket 310, a back case 320, or a battery cover 330 may be disposed in the portion S1-S1.

The window 411 may be transparent and disposed on the touch panel 412 and may allow an image from the display panel 412 (for example, the panel 162) to be seen from the outside.

The touch panel 412 (for example, the touch panel 152) may be disposed below the window 311 and may recognize a touch input. The touch panel 412 may use at least one of a capacitive, resistive, infrared, or ultrasonic method. A main circuit substrate 500 may receive a touch input from the touch panel 412.

The display panel 413 (for example, the panel 162) may be disposed below the touch panel 412. The display panel 413 may display signals transmitted from the main circuit substrate 500 as images. The display panel 413 may be a liquid-crystal display (LCD) or an active-matrix organic light-emitting diode (AM-OLED). The display panel 413 may be implemented to be flexible. The display panel 413 and the touch panel 412 may be configured with one module. The display panel 413, the window 411, and the touch panel 412 may be configured with one module (for example, a touch screen).

The digitizer 414 (for example, the pen sensor 154) may be disposed below the display panel 413 and may receive an input through the stylus (not depicted). The digitizer 414 may be implemented through a method similar or identical to that of receiving a user's touch input, for example, a capacitive, resistive, infrared, or ultrasonic method, or an additional sheet for recognition. A method of using the additional sheet for recognition may include an electro magnetic resonance (EMR) method.

The bracket 310 may be a mounting plate through which a plurality of electronic components may be installed. The bracket 310 may be a frame for fixing and supporting a plurality of electronic components (for example, the processor 110, the memory 120, the SIM card 114, the audio codec 180, the speaker 182, the receiver 184, the mike 188, the camera module 191, the indicator 197, the motor 198, the power management module 195, the battery 196, the communication module 130, the user input module 150, the display module 160, the interface 170, or the sensor module 140). The bracket 310 may include a first side at the top and a second side at the bottom. The first side and the second side of the bracket 310 may be a mounting surface for mounting an electronic component. The first side and/or the second side of the bracket 310 may include various forms of surfaces, for example, a flat surface, a curved surface, and an oblique surface. The bracket 310 may fix the window 411, the touch panel 412, the display panel 413, and the digitizer 414. The bracket 310 may fix the main circuit substrate 500. The bracket 310 may fix electronic components (for example, the camera module 191) including a printed circuit board (PCB). The bracket 310 may fix electronic components (for example, the sensor module 140, the user input module 150, the display module 160, or the interface 170) connected to the main circuit substrate 500 by using an electronic connection means (for example, a cable or a Flexible Printed Circuit Board "FPCB") as a medium. The bracket 310 may include a plurality of grooves for fixing a plurality of components. For example, the bracket 310 may include grooves 311 and 312 for fixing the window 411, the touch panel 412, the display panel 413, and the digitizer 414 at the top 3101. The bracket 310 may include a groove (315 of FIG. 4) for fixing the main circuit board (500 of FIG. 4) at the bottom (3102 of FIG. 4). The bracket 310 may include a groove (315 of FIG. 4) for receiving the electronic component (502 of FIG. 4) protruding toward the top direction (for example, the bracket 310) in the main circuit substrate 500. The bracket 310 may include a battery receiving groove 316-1 at the bottom (3102 of FIG. 4) for receiving a portion of the battery 416 (for example, the battery 196) and having a container form concave toward the bottom direction.

The bracket 310 may include a stylus receiving groove (317 of FIG. 4) for receiving a portion of the stylus (not depicted) and having a form concave toward the top direction. The bracket 310 may be molded with non-metallic or metallic material. The bracket 310 may include a metal part (for example, metal coating) electrically connected to the ground of the main circuit substrate 500. The exposed surface of the bracket 310 may be seen as a thin band of a border covering the front side of the electronic device 200.

Figure 4:
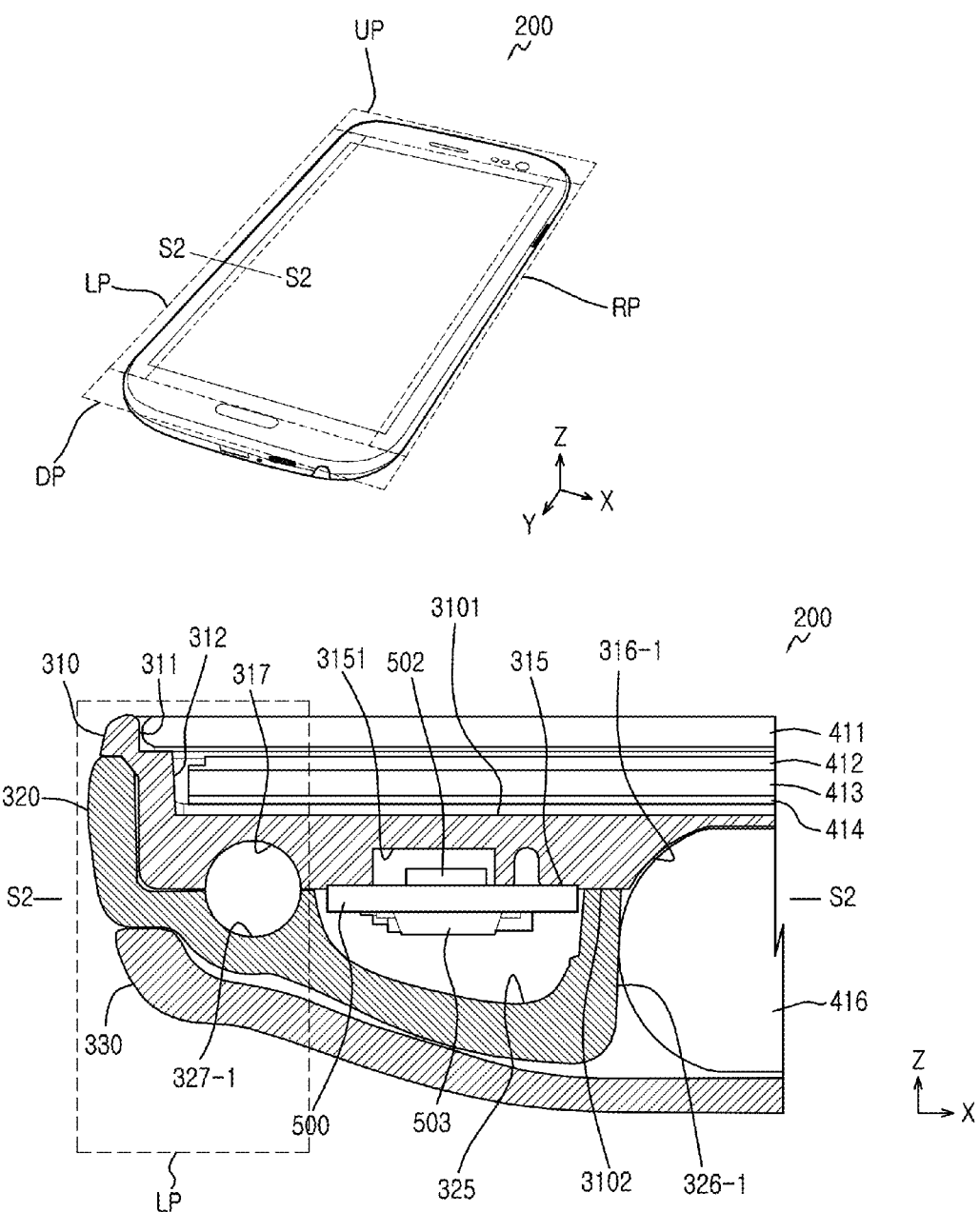
FIG. 4 is a partial sectional view corresponding to a portion S2-S2 of an electronic device according to an embodiment of the present disclosure.

The back case 320 may be coupled with the bracket 310 (for example, snap-fit coupling or bolt coupling). Additionally, according to various embodiments, the back case 320 may not be separated from the battery cover 330 and the back case 320 and the battery cover 330 may be integrated into one. The back case 320 may cover a plurality of components fixed by the bracket 310. The back case 320 may cover at least a portion of the main circuit substrate (500 of FIG. 4) fixed by the bracket 310. The bracket 310, the back case 320, and the main circuit substrate (500 of FIG. 4) may be coupled with each other through a bolt coupling method. The back case 320 may include a groove (325 of FIG. 4) for receiving the electronic component (503 of FIG. 4) protruding toward the bottom direction (for example, the back case 320) in the main circuit substrate (503 of FIG. 4). The back case 320 may include a battery penetration groove (326-1 of FIG. 4) penetrating the battery (416 of FIG. 4). As shown in FIG. 4, the battery penetration groove 326-1 may be an open form penetrating the top and bottom of the back case 320 and may communicate with a container form of a battery receiving groove 316-1 of the bracket 310. When the bracket 310 and the back case 320 are coupled with each other, the battery receiving groove 316-1 of the bracket 310 and the battery penetration groove 326-1 of the back case 320 may prepare a container form of a space for receiving the entire battery 416. The battery penetration groove 326-1 of the back case 320 may have a container form for receiving the entire battery 416 by itself and the battery receiving groove 316-1 of the bracket 310 may be unnecessary. Additionally, the battery receiving groove 316-1 may have a container form for receiving the entire battery 416 by itself and the battery penetration groove 326-1 of the back case 320 may be unnecessary. The back case 320 may receive a portion of the stylus 70 and may include a stylus receiving groove 327-1 concave toward the bottom direction. When the bracket 310 and the back case 320 are coupled with each other, the stylus receiving groove 317 of the bracket 310 and the stylus receiving groove 327-1 of the back case 320 may prepare a space for receiving the entire stylus (not depicted). The stylus receiving groove 327-1 of the back case 320 may be a space for receiving the entire stylus by itself and the stylus receiving groove 317 of the bracket 310 may be unnecessary. The stylus receiving groove 317 of the bracket 310 may be a space for receiving the entire stylus 70 by itself and the stylus receiving groove 327-1 of the back case 320 may be unnecessary. When the bracket 310, the back case 320, and the battery cover 330 are coupled with each other, at least a portion of the exposed surface may form the outer surface of the electronic device 200.

The battery cover 330 may be coupled with the back case 320 and may form the back side of the electronic device 200. The battery cover 330 may include a plurality of hooks (not shown) at the border, which are coupled with a plurality of hook coupling grooves of the back case 320.

FIG. 4 is a partial sectional view corresponding to a portion S2-S2 of an electronic device according to an embodiment of the present disclosure. The portion S2-S2 may be included in the left border LP of the electronic device 200. Referring to FIG. 4, in addition to the window 411, the touch panel 412, the display panel 413, the digitizer 414, the battery 416, the bracket 310, the back case 320, and the battery cover 330, at least a portion of the main circuit substrate 500 may be additionally disposed in the portion S2-S2.

The main circuit board 500 (for example, a main board or a mother board), as a substrate where a basic circuit and a plurality of components are mounted, may set an execution environment, maintain information, operate the electronic device 200 stably, and facilitate data input/output exchange of all devices of the electronic device 200 smooth. The main circuit substrate 500 may be coupled with the bracket 310 through a coupling method, such as a bolt or other mechanical fastener. At least a portion of the main circuit substrate 500 may not be disposed on at least one boarder part (for example, the left border LP, the right border part RP, the top border part UP, or the bottom border part DP). For example, at least a portion of the main circuit substrate 500 may not extend toward at least one border part (for example, the left border LP, the right border part RP, the top border part UP, or the bottom border part DP) and at least a portion of the main circuit substrate 500 may not be interposed between the bracket 310 and the back case 320 at such a border part.

According to an embodiment of the present disclosure, at least a portion of the main circuit board 500 may not be disposed at the left border part LP. At least a portion of the main circuit substrate 500 may be disposed between the receiving spaces 317 and 327-1 for the stylus 70 and the receiving spaces 316-1 and 326-1 for the battery 416. At least one border part (for example, the left border part LP or the right border part RP of FIG. 3), where at least a portion of the main circuit substrate 500 is not disposed, may become thin because it does not need to include a space for receiving at least a portion of the main circuit substrate 500, its structure and/or form may be disposed and/or molded without restriction.

Figure 5:
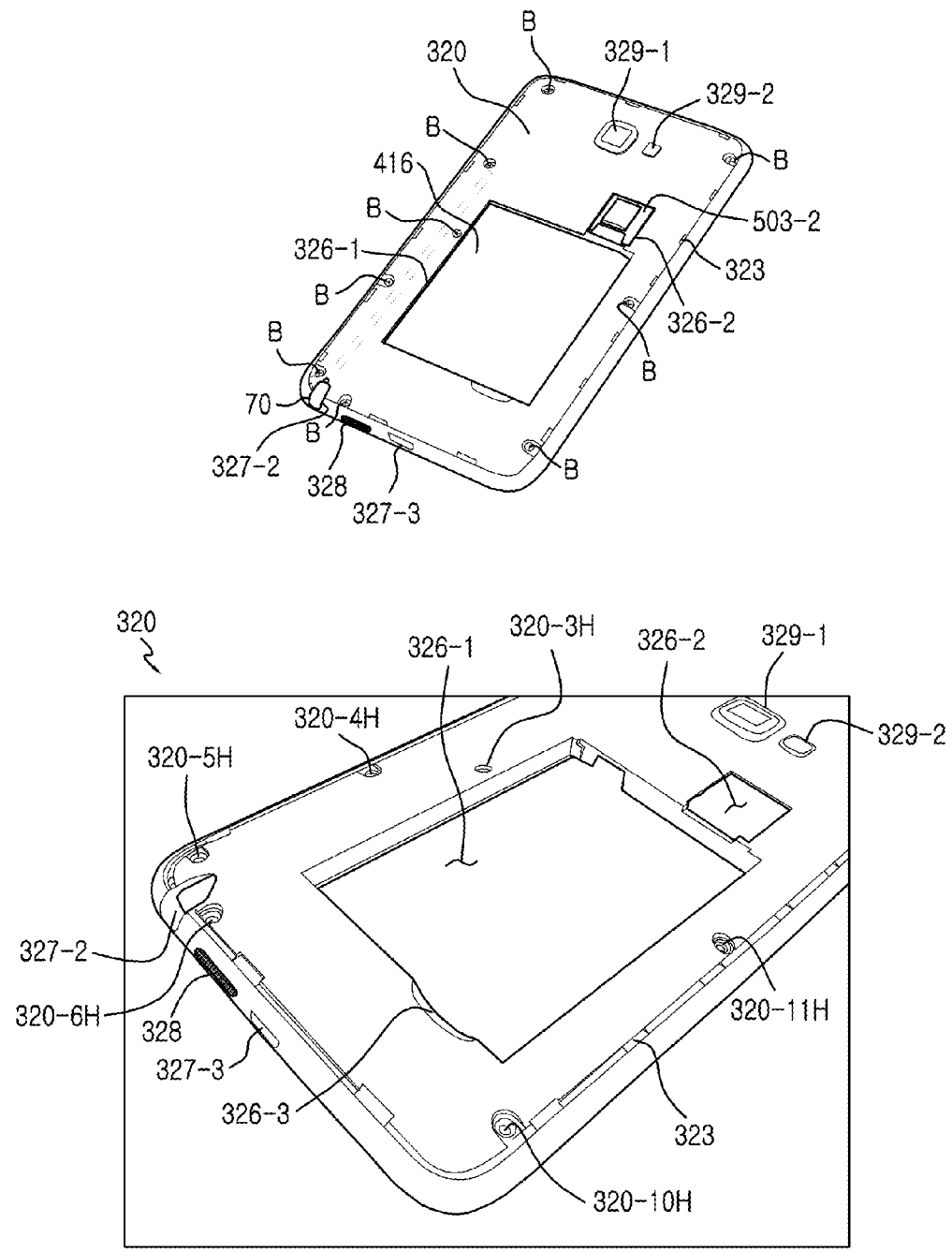
FIG. 5 is a perspective view illustrating an electronic device separated from a battery cover and a back case according to an embodiment of the present disclosure.

FIG. 5 is a perspective view illustrating an electronic device separated from a battery cover and a back case according to an embodiment of the present disclosure.

Referring to FIG. 5, the back case 320 may include a plurality of hook locking grooves 323, a pattern penetration groove 326-1, a socket penetration groove 326-2, a manipulation groove 326-3, a stylus entrance 327-2, a port opening hole 327-3, a speaker cover 328, a camera window 329-1, or a flash window 329-1. The plurality of hook locking grooves 323 may be formed inside the border and may be coupled with the hook (333 of FIG. 6) of the battery cover 330. The battery penetration groove 326-1 and the battery receiving groove (316-1 of FIG. 4) of the bracket (310 of FIG. 3) may form a space for mounting the battery 416. The socket penetration groove 326-2 may expose a memory socket 503-2 mounted on the main circuit substrate 500. The manipulation groove 326-3 is a space for allowing the finger tip to be put therein to hold the battery 416 while the battery 416 is separated. The stylus entrance 327-2, as an entrance where the stylus (not depicted) comes in and out, may communicate with the receiving spaces (317 and 327-1 of FIG. 4) for the stylus (not depicted). The port opening hole 327-3 may expose a socket (811 of FIG. 8) (for example, a USB socket) of a second peripheral device 900 of FIG. 12. The speaker cover 328 may be disposed in correspondence to the speaker 182 and be electrically connected to the main circuit substrate 500, and may include a plurality of penetration holes for communicating the sound of the speaker 182. The camera window 329-1 may be disposed in correspondence to the camera 161 electrically connected to the main circuit substrate 500, and may be transparent to transmit light through a lens of the camera 191. The flash window 329-2 may be disposed in correspondence to a flash electrically connected to the main circuit substrate 500, and may be transparent to transmit the light of the flash. The back case 320 may include bolt coupling holes 320-3H, 320-4H, 320-5H, 320-6H, 320-10H, and 320-11H penetrated by a plurality of bolts B in order to couple with the bracket (310 of FIG. 4).

Figure 6:
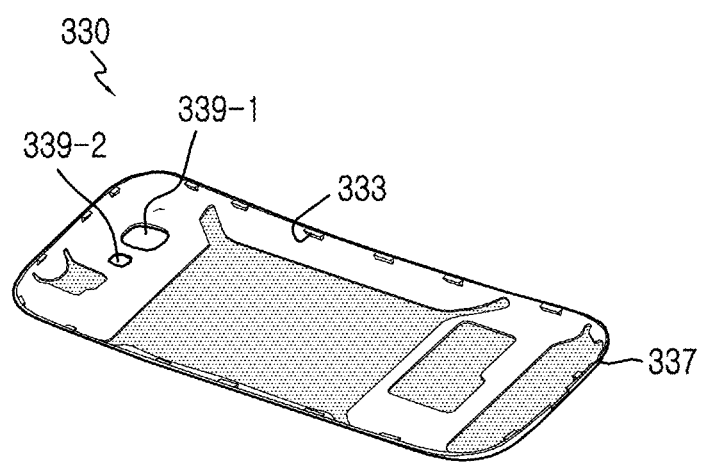
FIG. 6 is a perspective view illustrating a battery cover of an electronic device according to an embodiment of the present disclosure.

FIG. 6 is a perspective view illustrating a battery cover of an electronic device according to an embodiment of the present disclosure.

Referring to FIG. 6, the battery cover 330 may have a container form. The battery cover 330 may include a plurality of hooks 333, a stylus groove 337, a camera hole 339-1, and a flash hole 339-2. A plurality of hooks 333 may be formed at the border and may be coupled with the hook coupling groove 323 of the back case 320 of FIG. 5. The stylus groove 337 may be disposed in correspondence to the stylus entrance 327-2 of the back case 320 of FIG. 5 and may be fitted into an end portion of the stylus (not depicted). The camera hole 339-1 may expose the camera window 329-1 of the back case 320. The flash hole 339-2 may expose the flash window 329-2 of the back case 320 of FIG. 5.

Figure 7:
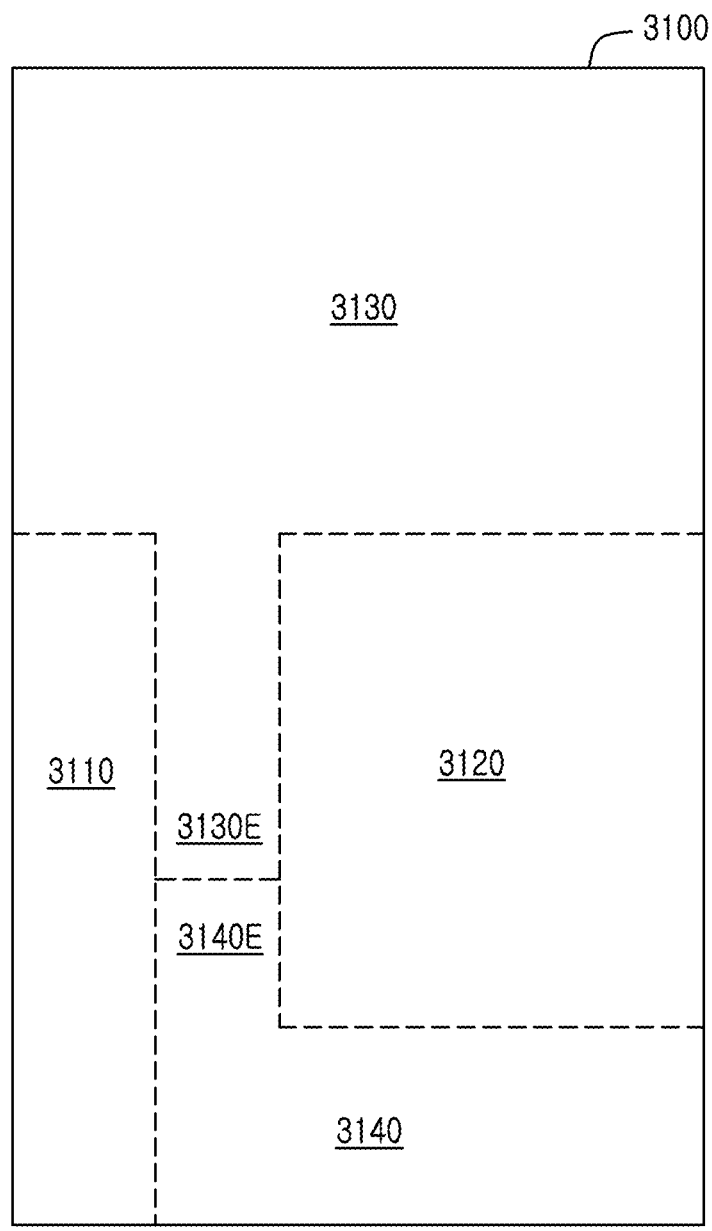
FIG. 7 is a view illustrating mounting areas of a bracket according to an embodiment of the present disclosure.

FIG. 7 is a view of dividing a mounting areas (or spaces) of housing according to an embodiment of the present disclosure. The housing may refer to a portion that receives components or a frame where apparatuses are disposed.

Referring to FIG. 7, the housing 3100 (for example, the mounting plate or the bracket 310) may include four mounting areas 3110, 3120, 3130, and 3140. The first area 3110 and the second area 3120 may be separated from each other. The third area 3130 and the fourth area 3140 may be connected to each other by using extended areas 3130E and 3140E that extend between the first area 3110 and the second area 3120 as media. A groove 317 of FIG. 4 for receiving the first component (for example, a stylus) may be disposed in the first area 3110. A groove 316-1 for receiving the second component (for example, the battery 416 of FIG. 4) may be disposed in the second area 3120. The main circuit substrate 500 may be disposed in the third area 3130. An extension part of the main circuit substrate 500 may be disposed in the extended area 3130E of the third area 3130. Components having a similar function to a connector for electrically or physically connecting components at different areas (for example, a male connector or a female connection) or a switch may be mounted on the extension part of the main circuit substrate 500 of FIG. 4. The third component (for example, a sub circuit substrate 800 of FIG. 12 and an antenna radiator 930 or a speaker 920 of FIG. 8) may be disposed in the fourth area 3140. Means (for example, an extension part of a sub circuit substrate, an FPCB, a cable or a connector) for electrically connecting to the extension part of the main circuit substrate 500 may be disposed in the extended area 3140E of the fourth area 3140. According to various embodiments, the first component, the second component, or the third component may include at least one of an input device (for example, a stylus), an input device (for example, a speaker), and a storage device (for example, a memory). According to an embodiment of the present disclosure, the first component, the second component, or the third component may include a plurality of electronic components.

Figure 8:
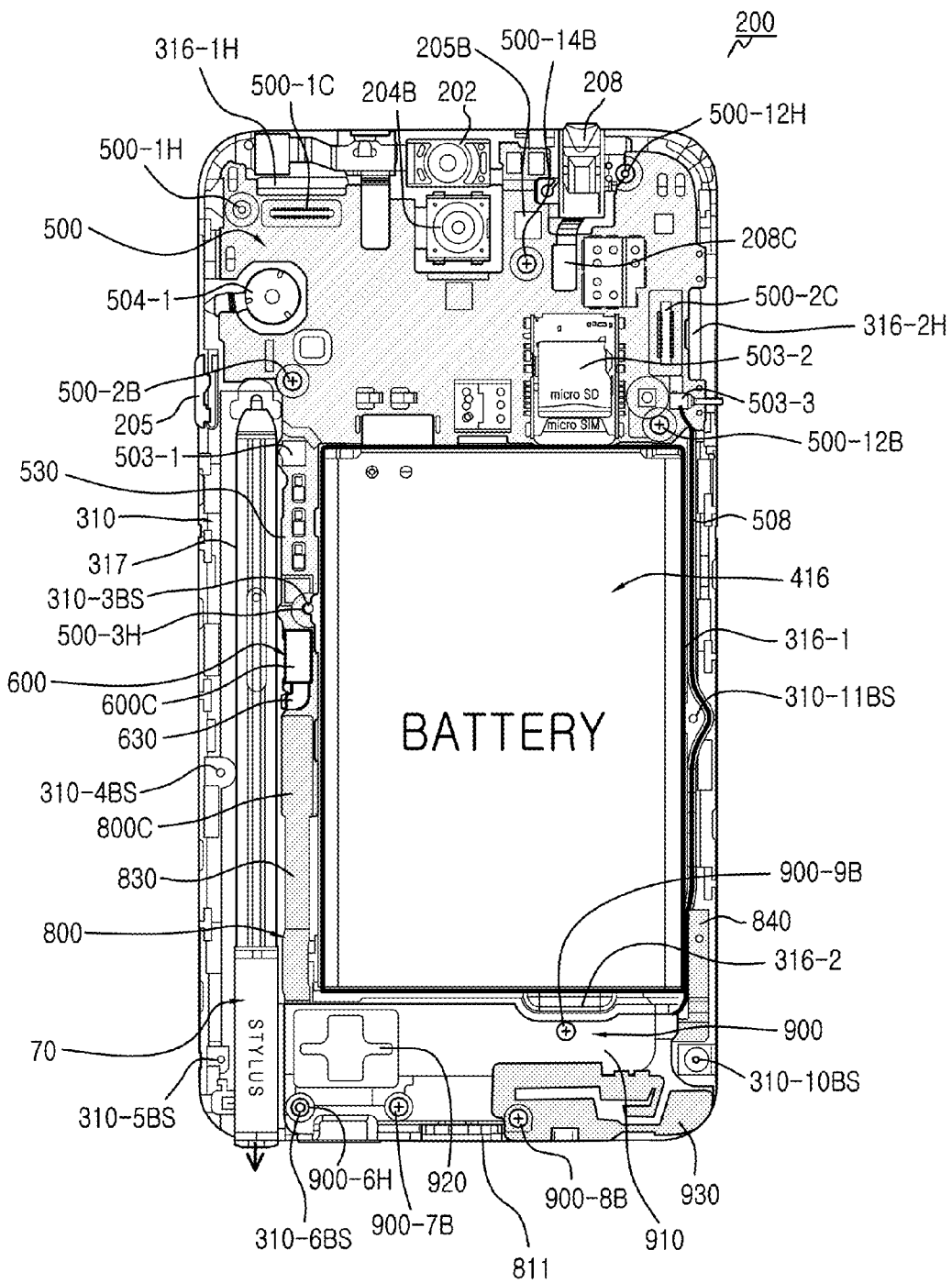
FIG. 8 is a perspective view illustrating an electronic device separated from a back case according to an embodiment of the present disclosure.

FIG. 8 is a perspective view illustrating an electronic device separated from a back case according to an embodiment of the present disclosure.

Referring to FIG. 8, the electronic device 200 may include a bracket 310, a battery receiving groove 316-1, a battery 416, a stylus receiving groove 317, a stylus 70, a main circuit substrate 500, a main circuit substrate extension part 530, a first peripheral device 600, a second peripheral device 800, and a third peripheral device 900.

The bracket 310 may include a plurality of grooves for fixing a plurality of electronic components. The bracket 310 may include grooves for fixing the main circuit board 500 where a plurality of electronic components is mounted. The bracket 310 may include grooves for fixing a plurality of electronic components connected to the main circuit substrate 500 by using an electrical connection means (for example, a cable or an FPCB) as a medium. The bracket 310 may fix the main circuit substrate 416. The bracket 310 may include a battery receiving groove 316-2 for receiving a portion of the battery 416. The bracket 310 may include a manipulation groove 316-2 for allowing the finger tip to be put therein to hold the battery 416 while the battery 416 is separated. The bracket 310 may include a stylus receiving groove 317 for receiving a portion of the stylus 70. The battery receiving groove 316-2 and the stylus receiving groove 317 are separated from each other. The battery receiving groove 316-1 may have a generally rectangular container form corresponding to the form of the battery 416. The stylus receiving groove 317 may be open to one side and may be a groove having a generally straight line form corresponding to the form of the stylus 70. The bracket 310 may include a plurality of bosses 310-3BS, 310-4BS, 310-5BS, 310-6BS, 310-10BS, and 310-11BS for coupling a plurality of bolts (not shown) so as to couple with the back case 320. The bracket 310 may include a plurality of bosses (not shown) for coupling a plurality of bolts (not shown) so as to couple with both the main circuit board 500 and the back case 320 of FIG. 5. The bracket 310 may include a plurality of bosses (not shown) for coupling a plurality of bolts 500-2B, 500-12B, and 500-14B so as to couple with the main circuit board 500.

The main circuit board 500, as a substrate where a basic circuit and a plurality of electronic components (for example, the processor 110, the memory 120, the audio codec 180, the power management module 195, or the indicator 197 of FIG. 1) are mounted, may set an execution environment of the electronic device 200, maintain the information, drive the electronic device 200 stably, and make data input/output exchange of all devices of the electronic device 200 smooth. The main circuit substrate 500 may be flat substrate formed of an insulating material such as an epoxy resin or a phenolic resin. The main circuit substrate 500 may include a surface mounted stylus detector 503-1, a memory socket 503-2, and a Radio Frequency (RF) switch 503-3. The stylus detector 503-1 (for example, the stylus detector 140N) may detect the removal of the stylus 70. The memory socket 503-2 may have a type in which heterogeneous memory sockets are stacked. Heterogeneous memory cards may include a Micro Subscriber Identity Module (SIM) card and a Micro Secure Digital (SD) card. The RF switch 503-3 may connect an antenna (for example, the antenna radiator 930) and a wireless communication module (for example, the RF module 134) and may be used for the performance test of an antenna. A plurality of electronic components may be electrically connected to the main circuit substrate 500 by using an electrical connection means (for example, a cable or an FPCB) as a medium. The main circuit substrate 500 may include a plurality of female connectors and may electrically connect to male connectors of a plurality of electronic components. For example, a male connector (not shown) extending from the display panel 413 from FIG. 4 by using an FPCB as a medium may penetrate the penetration hole 316-1H of the bracket 310 and may be electrically connected to the female connector 500-1C of the main circuit substrate 500. A male connector (not shown) extending from the touch panel 412 from FIG. 4 by using an FPCB as a medium may penetrate the penetration hole 316-2H of the bracket 310 and may be electrically connected to the female connector 500-2C of the main circuit substrate 500. A male connector (not shown) extending from the digitizer 414 of FIG. 4 by using an FPCB as a medium may be electrically connected to a specific female arm connector of the main circuit substrate 500. A male connector 208C extending from the digitizer 208 by using an FPCB as a medium may be electrically connected to a specific female arm connector of the main circuit substrate 500. Other various electronic components (for example, the speaker 202, the rear camera 204B, the flash 205B, the vibration motor 504-1 (for example, the motor 198 of FIG. 1), or the key 205 (for example, 156 of FIG. 1) may be electrically connected to the main circuit substrate 500 by using an FPCB as a medium. The main circuit substrate 500 may include a plurality of bolt coupling holes (not shown) penetrated by the plurality of bolts 500-2B, 500-12B, and 500-14B so as to couple with the bracket 310. The main circuit substrate 500 may be interposed between the bracket 310 and the back case 320 and may include bolt coupling holes 500-1H, 500-3H, and 500-12H penetrated by a plurality of bolts (not shown).

The main circuit substrate 500 may be disposed not to overlap the battery receiving groove 316-2 and the stylus receiving groove 317. The main circuit substrate 500 may include an extension part 530 extending between the battery receiving groove 316-2 and the stylus receiving groove 317. The extension part 530 of the main circuit substrate 500 may include an FPCB. The extension part 530 of the main circuit substrate 500 may occupy at least a portion of an area (for example, the 3130E of FIG. 7) between the battery receiving groove 316-1 and the stylus receiving groove 317. The extension part 530 of the main circuit substrate 500 may include a plurality of electronic components. The extension part 530 may include female connectors (for example, the female connectors 530-1C and 530-2C of FIG. 14) electrically connected to the male connectors 600C and 800C of the peripheral devices 600 and 800. The extension part 530 may include a stylus detector 503-1 (for example, the stylus detector 140N). The stylus detector 503-1 may include a detection terminal responding to the removal of a stylus and the detection terminal may be disposed toward the stylus receiving groove 317 of the bracket 310. The stylus detector 503-1 may be disposed at the point where the extension part 530 of the main circuit substrate 500 starts. The extension part 530 of the main circuit substrate 500 may include a bolt coupling hole 500-3H corresponding to the boss 310-3BS of the bracket 310. The back case 320 coupled later may include the bolt coupling hole 320-3H corresponding to the bolt coupling hole 500-3H of the extension part 530. By using a bolt, the boss 310-3BS of the bracket 310, the bolt coupling hole 500-3H of the extension part 530 of the main circuit substrate 500, and the bolt coupling hole 320-3H of FIG. 5 of the back case 320 may be coupled with each other. According to an embodiment of the present disclosure, a space is prepared between a stylus receiving space and a battery receiving space and also the bolt coupling hole 500-3H of the extension part 530 of the main circuit substrate 500, the boss 310-3BS of the bracket 310, and the bolt coupling hole 320-3H of FIG. 5 of the back case 320 are bolt-coupled with each other in the space. Therefore, the coupling rigidity between the bracket 310, the main circuit substrate 500, and the back case 320 may be improved. According to various embodiments, there may be a plurality of bolt coupling portions between the bracket 310, the main circuit substrate 500, and the back case 320, which are provided in a space between a stylus receiving space and a battery receiving space. The bolt coupling hole 500-3H of the extension part 530, the boss 310-3BS of the bracket 310 corresponding thereto, and the bolt coupling hole 320-3H of FIG. 5 of the back case 320 are disposed further inside the electronic device 200 than other bolt coupling portions. Therefore, the coupling rigidity between coupling components (for example, the bracket 310, the main circuit substrate 500, and the back case 320 of FIG. 5) may be improved.

The first to third peripheral devices 600, 800, and 900 may be disposed in an area of the bracket 310 that the main circuit substrate 500, the battery receiving groove 316-1, and the stylus receiving groove 317 do not occupy.

The first peripheral device 600 may be a module relating to a key (for example, a press key or a touch key). The first peripheral device 600 may include a key circuit unit (not shown) where no keys are mounted, an FPCB 630 extending from the key circuit unit, and a male connector 630C mounted on the FPCB 630. A male connector 630C extending by using the FPCB 630 as a medium may be electrically connected to a female connector (for example, the female connector 530-1C of FIG. 14) mounted on the extension part 530 of the main circuit substrate 500. The key circuit unit may be disposed between the bracket 310 and the window 411 of FIG. 4. The FPCB 630 penetrates a through hole (not shown) of the bracket 310 to protrude toward the back side of the bracket 310. A portion of the FPCB 630 may be disposed between the battery receiving groove 316-1 and the stylus receiving groove 317. The FPCB 630 may overlap a portion of the FPCB 630 of the main circuit substrate 500. A portion of the FPCB 630 may be disposed between the extension part 530 of the main circuit substrate 500 and the bracket 310.

The second peripheral device 800 may be a module relating to a socket (for example, an external port 206 of FIG. 2). The second peripheral device 800 may include a PCB (not shown) where no socket 811 is mounted, a first FPCB 830 extending from the PCB, and a male connector 800C mounted on the first FPCB 830. The male connector 800C extending by using the FPCB 1 as a medium may be electrically connected to a female connector (for example, the female connector 530-1C of FIG. 14) mounted on the extension part 530 of the main circuit substrate 500. The PCB may be disposed between the bracket 310 and a carrier 910 of the third peripheral device 900. The PCB may include terminals (not shown) (for example, elastic contact terminals) electrically contacting speaker terminals (not shown) of the third peripheral device 900. The PCB of the second peripheral device 800 may include terminals (not shown) electrically contacting antenna terminals (not shown) of the third peripheral device 900. The PCB may be electrically connected to the RF switch 503-3 of the main circuit substrate 500 by using a cable as a medium. The cable 508 may be disposed between the battery receiving hole 316-1 of the bracket 310 and the border. The first FPCB 830 may be disposed between the battery receiving groove 316-1 of the bracket 310 and the stylus receiving groove 317 of the bracket 310. The first FPCB 830 may overlap a portion of the extension part 530 of the main circuit substrate 500. The second FPCB 840 may be disposed between the battery receiving groove 316-1 of the bracket 310 and the border of the bracket 310. The PCB may be interposed between the bracket 310 and the carrier 910 of the third peripheral device 900 and may include a plurality of bolt coupling holes (not shown) penetrated by the plurality of bolts 900-7B, 900-8B, and 900-9B.

The third peripheral device 900 may be a module relating to a speaker or an antenna. The third peripheral device 900 may include a carrier 910, that is, non-metal injection molding, and a speaker 920 fixed at the carrier 910, and an antenna radiator 930. The carrier 910 may be disposed on the PCB of the second peripheral device 800. Speaker terminals (not shown) of the speaker 920 may be disposed on the surface of the carrier 910. Antenna terminals (not shown) of the antenna radiator 930 may be disposed on the surface of the carrier 910. The antenna terminals may be electrically connected to the terminals of the PCB of the second peripheral device 800. The antenna radiator 930 may receive feeding by using the second peripheral device 800 as a medium and may then radiate radio waves. The antenna radiator 930 may be electrically connected to the RF switch 503-3 of the main circuit substrate 500 by using the second peripheral device 800 and the cable 508 as medium. The speaker terminals may be electrically connected to the terminals of the PCB of the second peripheral device 800. The speaker 920 may receive audio signals from the main circuit substrate 500 by using the second peripheral device 800 as a medium and output them. The carrier 910 of the third peripheral device 900 may include a plurality of bolt coupling holes (not shown) penetrated by the plurality of bolts 900-7B, 900-8B, and 900-9B so as to couple with the bracket 310. The bracket 310 may include a boss 310-6BS coupled with a bolt (not shown) so as to couple with the back case 320 of FIG. 5 and the carrier 910 of the third peripheral device 900 may include a boss penetration hole 900-6H to penetrate the boss 310-6BS.

The antenna radiator 930 of the third peripheral device 900 and wireless communication related components connected thereto (for example, a plurality of electronic components including the terminals of the second peripheral device 800 and the cable 508) may be disposed at the position for preventing nose that deteriorates the performance of the socket 811 of the second peripheral device 80. For example, the antenna radiator 930 may not overlap the FPCB 930 of the second peripheral device 800.

The antenna radiator 930 of the third peripheral device 900 and wireless communication related components connected thereto (for example, a plurality of electronic components including the terminals of the second peripheral device 800 and the cable 508) may be disposed at the position for preventing nose that deteriorates the performance of the speaker 920 of the third peripheral device 900.

Figure 9:
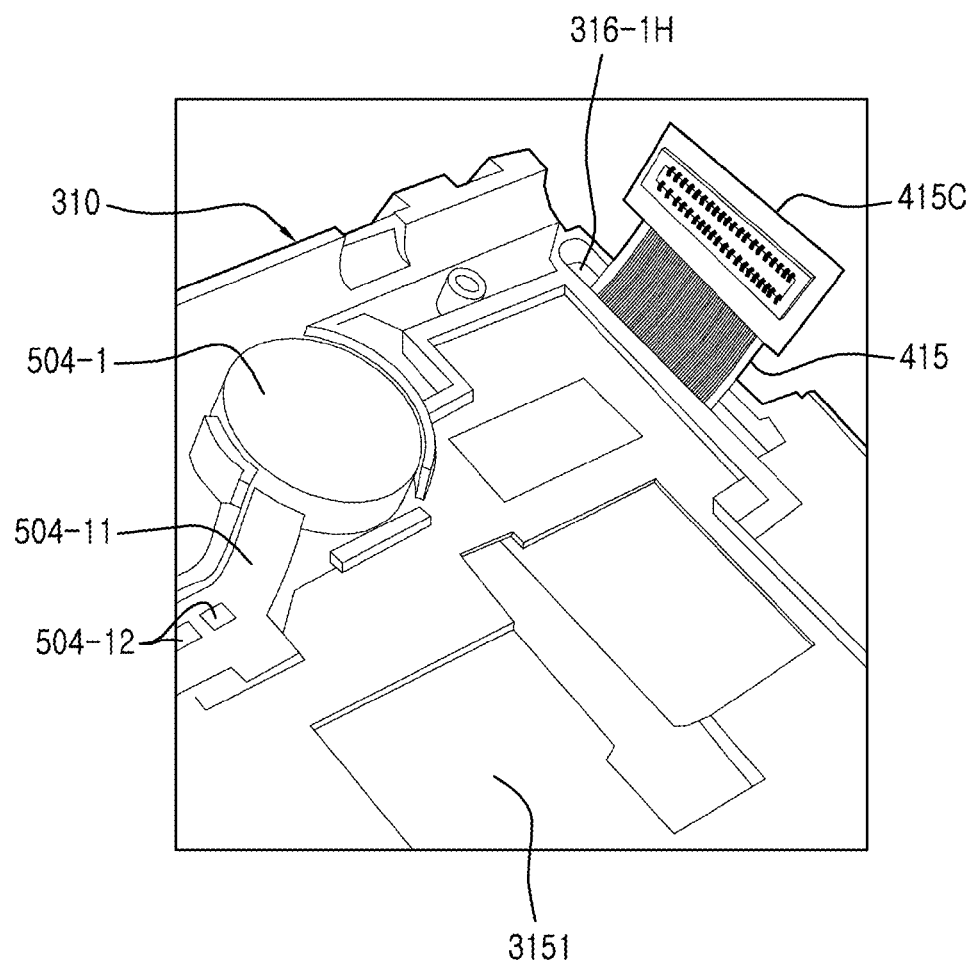
FIG. 9 is a perspective view illustrating a bracket separated from a main circuit substrate according to an embodiment of the present disclosure.

FIG. 9 is a perspective view illustrating a bracket separated from a main circuit substrate according to an embodiment of the present disclosure.

Referring to FIG. 9, the bracket 310 of FIG. 3 may include the penetration hole 316-1H penetrating an FPCB 415 extending from the display panel 413. A male connector 415C mounted on the FPCB 415 penetrating the through hole 316-1H of FIG. 8 of the bracket 310 may be electrically connected to the female connector 500-2C of the main circuit substrate 500. The bracket 310 may include a groove 3151 of FIG. 4 for fixing the main circuit board 500. The bracket 310 may fix a plurality of electronic components that are electrically connected to the main circuit substrate 500. For example, the bracket 310 may fix a vibration motor 504-1 and an FPCB 504-11 electrically connected to the vibration motor 504-1. The FPCB 504-11 may include a plurality of copper pads 504-12. The main circuit substrate 500 may include terminals (for example, elastic contact terminals) corresponding to the copper pads 504-12. When the main circuit substrate 500 is seated on the bracket 310, the terminals of the main circuit substrate 500 and the copper pads 504-12 of the FPCB 504-11 may be electrically connected to each other.

Figure 10:
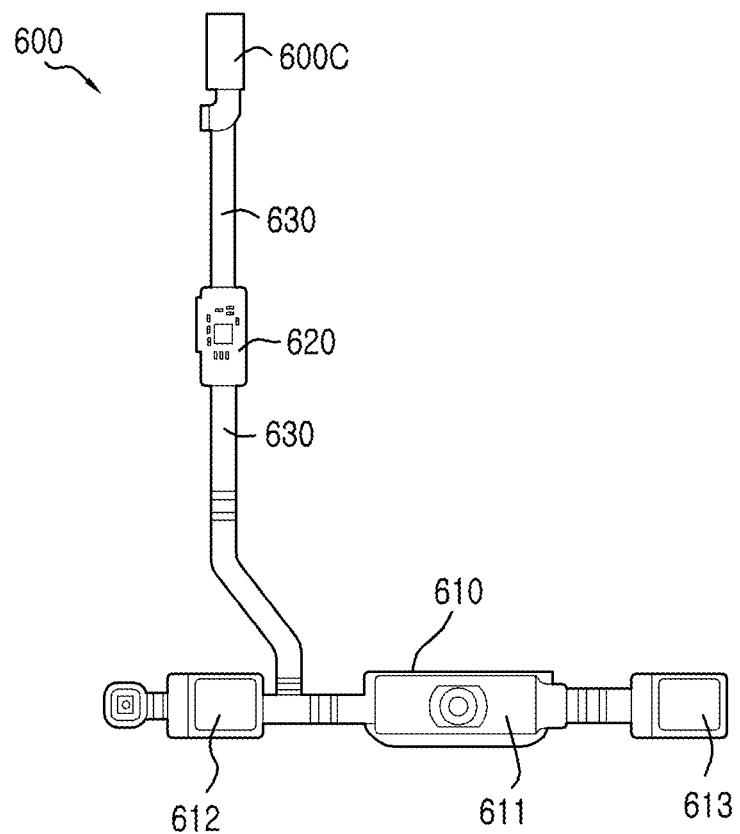
FIG. 10 is a perspective view of a first peripheral device according to an embodiment of the present disclosure.

FIG. 10 is a perspective view of a first peripheral device according to an embodiment of the present disclosure.

Referring to FIG. 10, the first peripheral device 600 may include a key circuit unit 610, an FPCB 630, and a male connector 600C. The key circuit unit 610 may mount a plurality of keys (for example, the press key 611 and the touch keys 612 and 613). The control circuit unit 620 may recognize the press or touch of the keys 611, 612, and 613 of the key circuit unit 610. The FPCB 630 may extend from the key circuit unit 610 and may mount the male connector 630C and the control circuit unit 620. The first peripheral device 600 may be implemented with an FPCB. The male connector 600C may be electrically connected to the female connector 530-1C of FIG. 14 mounted on the extension part 530 of the main circuit substrate 500. The key circuit unit 610 may be disposed between the bracket 310 and the window 411 of FIG. 4 and mounted on the first side of the bracket 310. The FPCB 630 penetrates the through hole 316-3H of FIG. 12 of the bracket 310 to protrude toward the second side of the bracket 310. A portion of the FPCB 630 may be disposed between the battery receiving groove 316-1 and the stylus receiving groove 317 of FIG. 4. The FPCB 630 may overlap at least a portion of the extension part 530 of the main circuit substrate 500. At least a portion of the FPCB 630 may be disposed between the extension part 530 of the main circuit substrate 500 and the bracket 310 of FIG. 8.

Figure 11:
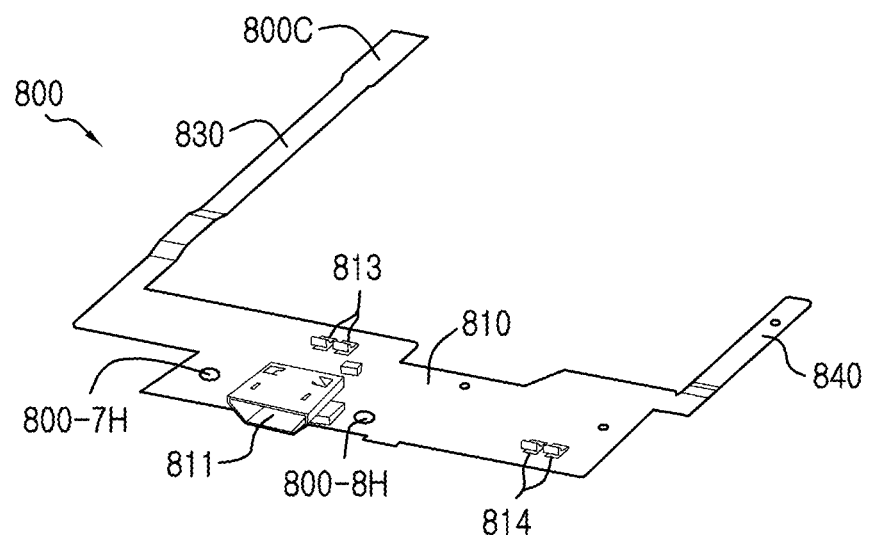
FIG. 11 is a perspective view of a second peripheral device according to an embodiment of the present disclosure.
Figure 11:
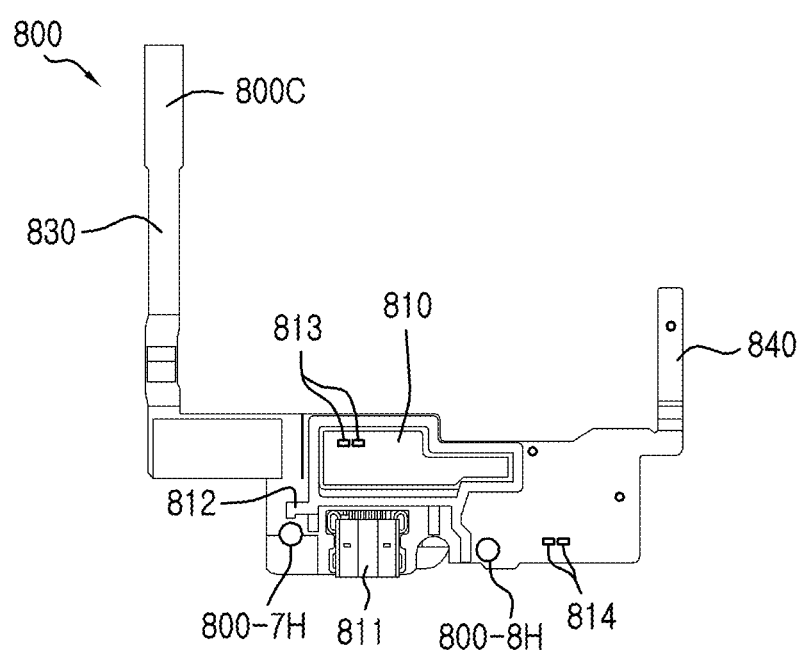

FIG. 11 is a perspective view of a second peripheral device according to an embodiment of the present disclosure.

Referring to FIG. 11, the second peripheral device 800 may include a PCB 810, a first FPCB 830, a second FPCB 840, and a male connector 800C. The PCB 810 may include a socket (for example, the external port 206). The PCB 810 may include a ground 812. The PCB 810 may include elastic contact terminals 813 (for example, a C-clip) electrically contacting the speaker terminals 921 of FIG. 12 of the third peripheral device 900. The PCB 810 may include elastic contact terminals 814 (for example, a C-clip) electrically contacting the antenna terminals 931 of FIG. 12 of the third peripheral device 900. The elastic contact terminals 814 may include a feeding terminal for feeding and a ground terminal for grounding. The feeding terminal may receive an applied current from the main circuit board 500 connected by using the first FPCB 830 as a medium. The ground terminal may be electrically connected to the ground 812 of the PCB 810 of the second peripheral device 800 and the ground of the main circuit substrate 500 of FIG. 8 connected by using the first FPCB 830. The PCB 810 may include a terminal (not shown) electrically connected to the RF switch 503-3 of the main circuit substrate 500 of FIG. 8 by using the cable 508 as a medium. The PCB 810 may include bolt coupling holes 800-7H and 800-8H. The coupling holes 800-7H and 800-8H may be interposed between the bracket 310 of FIG. 8 and the carrier 910 of the third peripheral device 900 of FIG. 9 and may be penetrated by a plurality of bolts (not shown). The PCB 810 may be disposed between the bracket 310 and the carrier 910 of the third peripheral device 900 of FIG. 12. The first FPCB 830 may extend from the PCB 810 and mount the male connector 800C. The male connector 800C may be electrically connected to the female connector 530-2C of FIG. 14 of the extension part 530 of the main circuit substrate 500. The second FPCB 840 may extend from the PCB 810. The first FPCB 830 may be disposed between the battery receiving groove 316-1 and the stylus receiving groove 317 of FIG. 4. The first FPCB 830 may overlap a portion of the extension part 530 of the main circuit substrate 500. The second FPCB 840 may be disposed between the battery receiving groove 316-1 and the border of the bracket 310.

Figure 12:
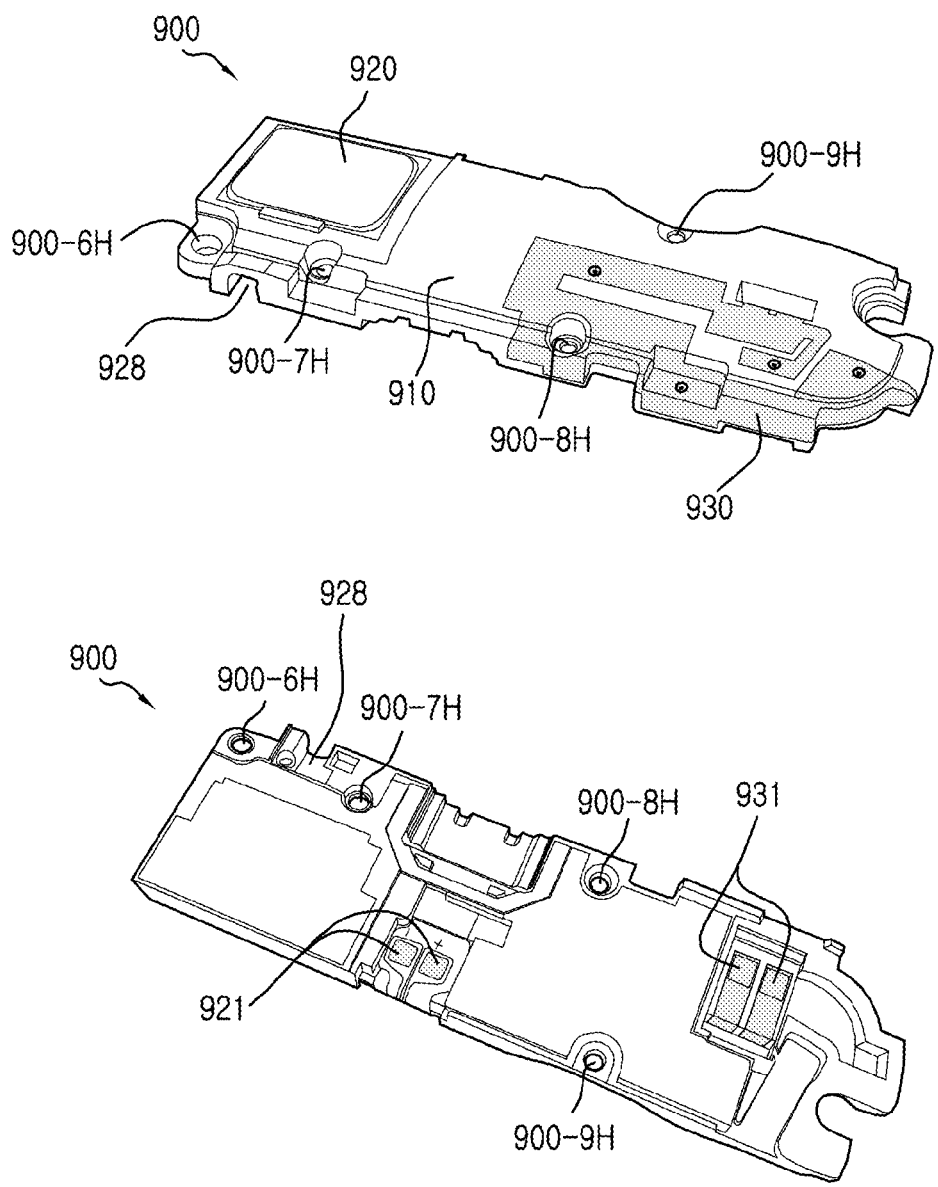
FIG. 12 is a perspective view of a third peripheral device according to an embodiment of the present disclosure.

FIG. 12 is a perspective view of a third peripheral device according to an embodiment of the present disclosure. The upper picture is a top side perspective view of the third peripheral device 900 and the lower picture is a bottom side perspective view of the third peripheral device 900.

Referring to FIG. 12, the third peripheral device 900 may include a carrier 910, a speaker 920, and an antenna radiator 930. The carrier 910 may be a non-metal injection molding. The carrier 910 may be disposed on the PCB 810 of the second peripheral device 800 of FIG. 8. Speaker terminals 921 of the speaker 920 may be disposed on the bottom side of the carrier 910. The carrier 910 may include a hole 928 for outputting the sound from the speaker 920 to the speaker cover 328 of the back case 320 of FIG. 5. Antenna terminals 931 of the antenna radiator 930 may be disposed on the bottom side of the carrier 910. The carrier 910 may be disposed on the PCB 810 of the second peripheral device 800 of FIG. 11. The speaker terminals 921 may be electrically connected to the terminals 813 of FIG. 11 of the PCB 810 of the second peripheral device 800. The antenna terminals 931 may be electrically connected to the elastic contact terminals 814 of FIG. 11 of the PCB 810 of the second peripheral device 800. The antenna terminals 931 may include a feeding terminal for feeding and a ground terminal for grounding. The antenna radiator 930 may be electronically connected to the second peripheral device 800 through the antenna terminals 931 and may operate as an Inverted F Antenna (IFA) or a Planar Inverted F Antenna (PIFA). The carrier 910 may include a plurality of bolt coupling holes 900-7H, 900-8H, and 900-9H penetrated by the plurality of bolts 900-7B, 900-8B, and 900-9B of FIG. 8 so as to couple with the bracket 310. The carrier 910 may include a boss penetration hole 900-6H penetrating the boss 900-6BS of FIG. 8 of the bracket 310.

Figure 13:
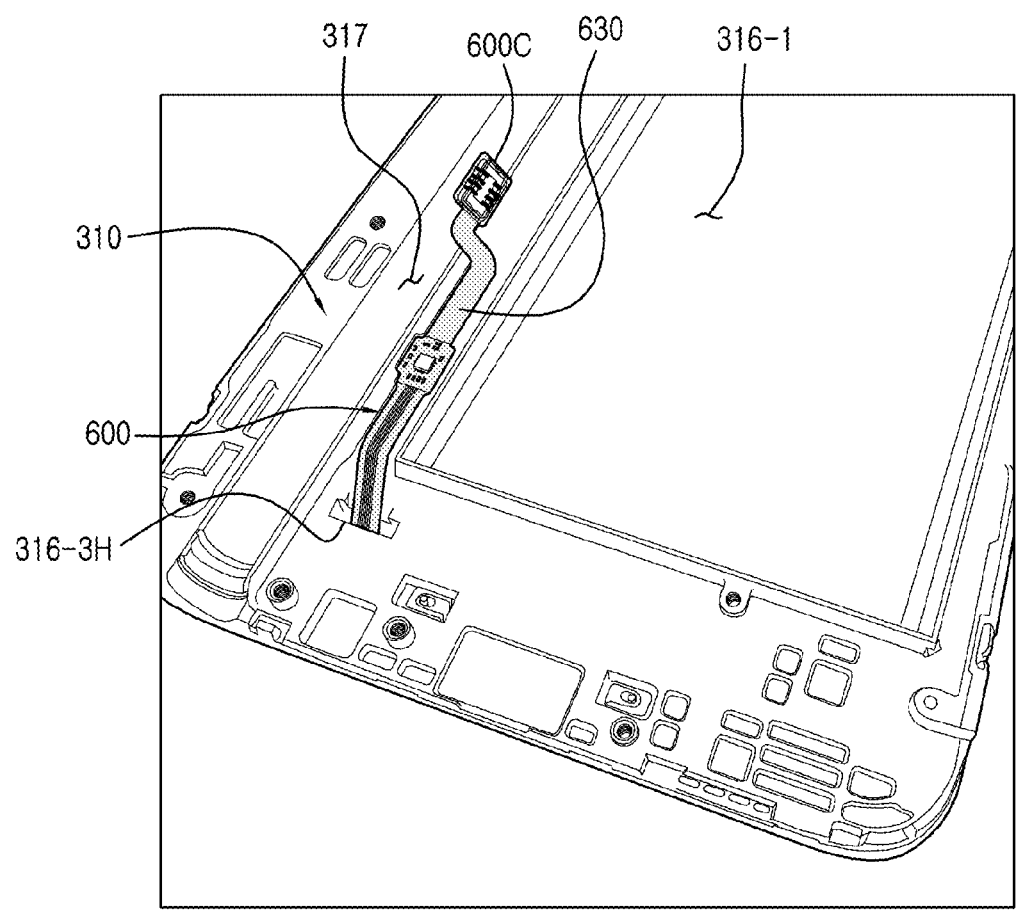
FIG. 13 is a perspective view of a first peripheral device coupled with a bracket according to an embodiment of the present disclosure.

FIG. 13 is a perspective view of a first peripheral device coupled with a bracket according to an embodiment of the present disclosure.

Referring to FIG. 13, the bracket 310 may include a first side at the top and a penetration hole 316-3H penetrating a first side at the bottom. The key circuit unit 610 of FIG. 10 of the first peripheral device 600 may be mounted on the first side of the bracket 310 and the FPCB 630 of the first peripheral device 600 may penetrate the penetration hole 316-3H of the bracket 310 to be mounted on the second side of the bracket 310. A portion of the FPCB 630 of the first peripheral device 600 may be disposed between the battery receiving groove 316-1 of the bracket 310 and the stylus receiving groove 317. The male connector 600C of the first peripheral device 600 may be electrically connected to the female connector 530-1C of FIG. 14 of the extension part 530 of the main circuit substrate 500 by bending the FPCB 630.

Figure 14:
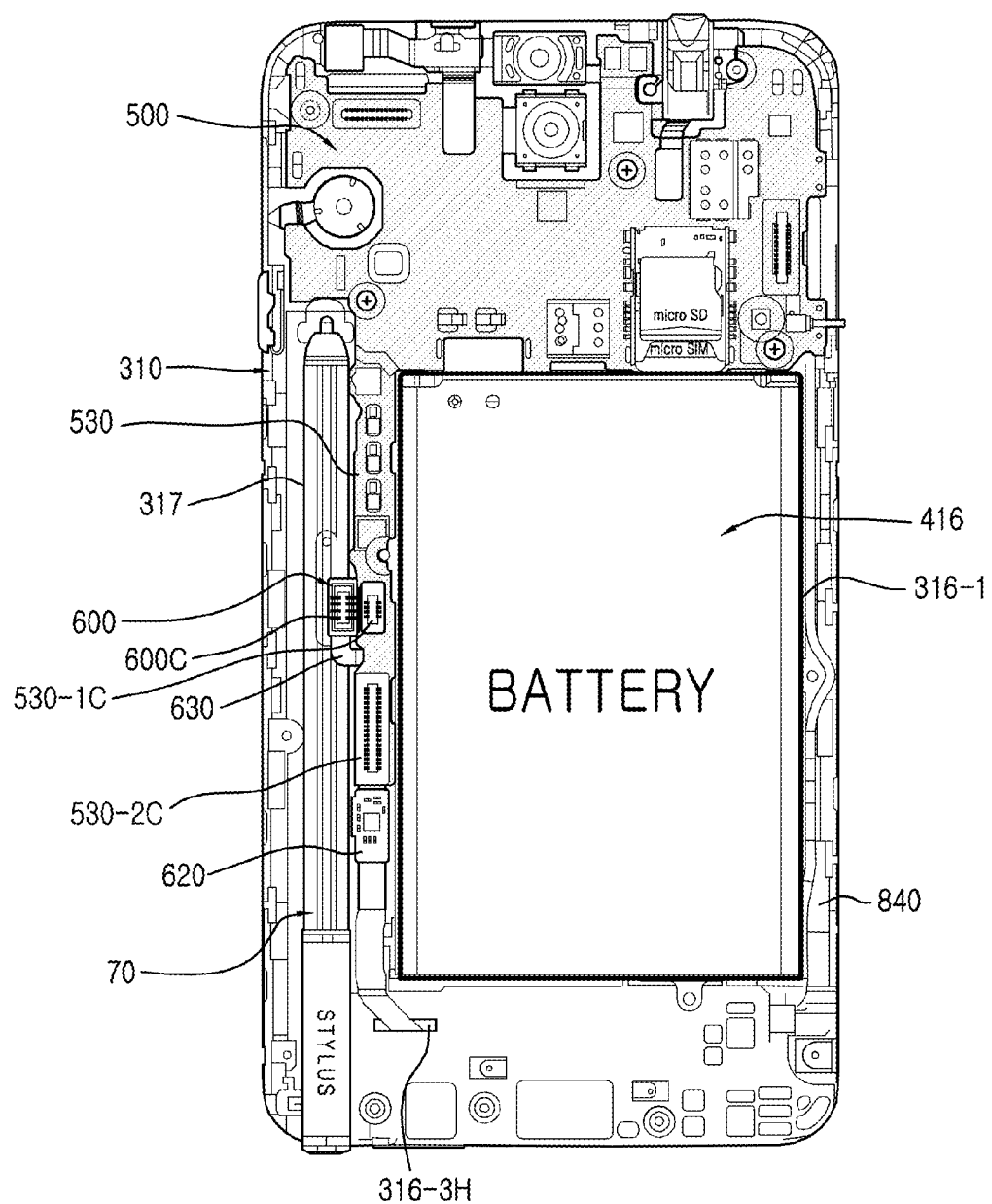
FIG. 14 is a perspective view when a first peripheral device, a main circuit substrate, and a bracket are combined with each other according to an embodiment of the present disclosure.

FIG. 14 is a perspective view when a first peripheral device, a main circuit substrate, and a bracket are combined with each other according to an embodiment of the present disclosure.

Referring to FIG. 14, the FPCB 630 of the first peripheral device 600 may be disposed between the battery receiving groove 316-1 of the bracket 310 and the stylus receiving groove 317 as penetrating the penetration hole 316-3H of the bracket 310. The main circuit substrate 500 is fixed at the bracket 310 and the extension part 530 of the main circuit substrate 500 may be disposed between the battery receiving groove 316-1 of the bracket 310 and the stylus receiving groove 317. A portion of the extension part 530 of the main circuit substrate 500 may be disposed overlapping on a portion of the FPCB 630 of the first peripheral device 600. The male connector 600C mounted on the FPCB 630 of the first peripheral device 600 may be electrically connected to the female connector 530-1C mounted on the extension part 530 of the main circuit substrate 500. The remaining one female connector 530-2C mounted on the extension part 530 of the main circuit substrate 500 may be exposed. When the second peripheral device 800 is additionally coupled, the remaining one female connector 530-2C may be electrically connected to the male connector 800C of FIG. 8 of the second peripheral device 800.

Figure 15:
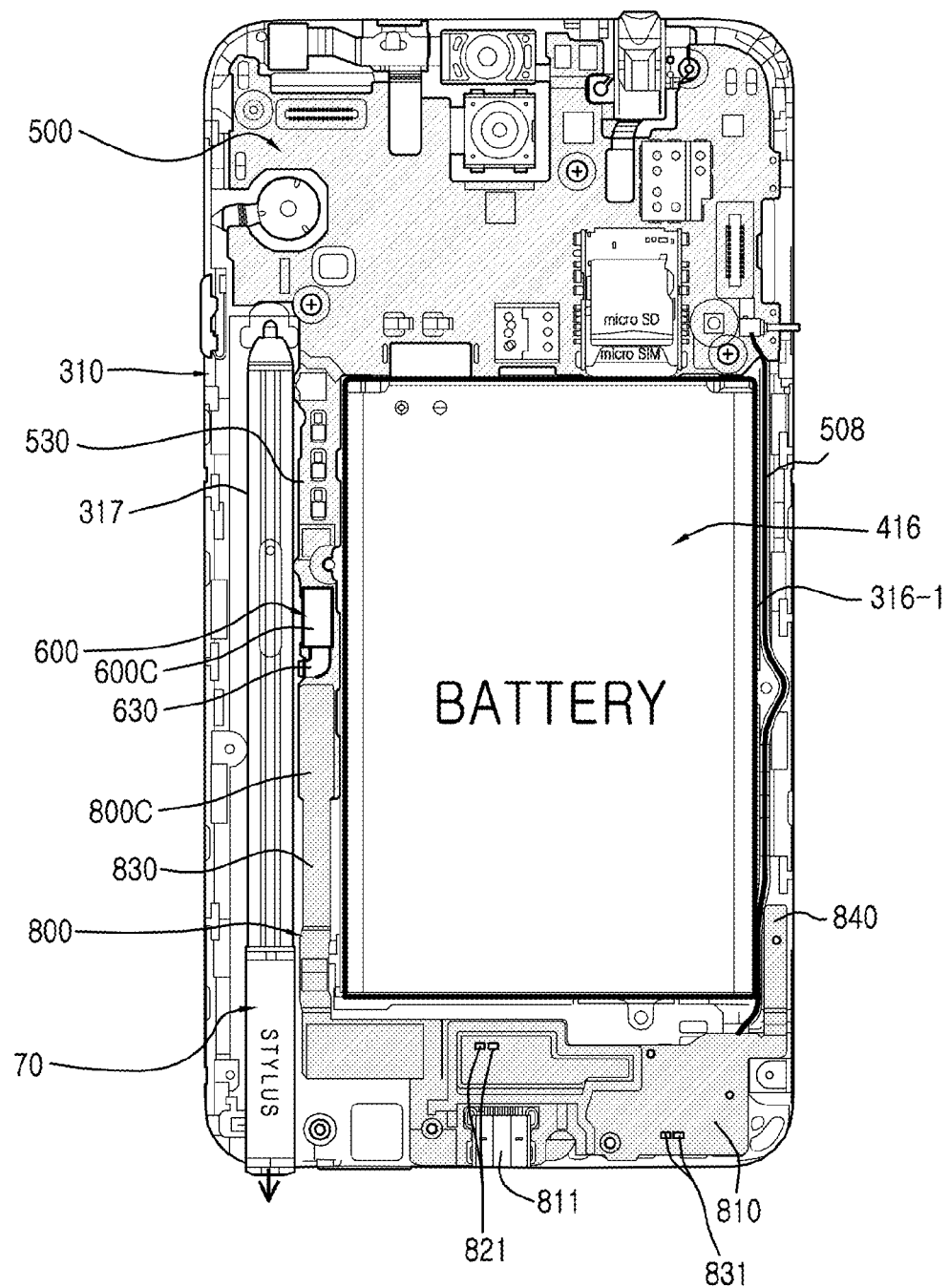
FIG. 15 is a perspective view when a first peripheral device, a main circuit substrate, a second peripheral device, and a bracket are combined with each other according to an embodiment of the present disclosure.

FIG. 15 is a perspective view when a first peripheral device, a main circuit substrate, a second peripheral device, and a bracket are combined with each other according to an embodiment of the present disclosure.

Referring to FIG. 15, the second peripheral device 800 may be disposed in an area of the bracket 310 that the battery receiving groove 316-1 and the stylus receiving groove 317 do not occupy. The socket 811 of FIG. 11 mounted on the PCB 810 of the second peripheral device 800 may be disposed on the border of the electronic device 200. The first FPCB 830 of the second peripheral device 800 may extend from the PCB 810 and may be disposed between the battery receiving groove 316-1 of the bracket 310 and the stylus receiving groove 317. A portion of the first FPCB 830 of the second peripheral device 800 may be disposed overlapping on a portion of the extension part 530 of the main circuit substrate 500. The male connector 800C mounted on the first FPCB 830 of the second peripheral device 800 may be electrically connected to the female connector 530-2C of FIG. 14 of the extension part 530 of the main circuit substrate 500. A portion of the first FPCB 830 of the second peripheral device 800 may be disposed overlapping on a portion of the FPCB 630 of the first peripheral device 600 and a portion of the extension part 530 of the main circuit substrate 500. The second FPCB 840 of the second peripheral device 800 may extend from the PCB 810 and may be disposed between the battery receiving groove 316-1 of the bracket 310 and the border. The terminals 813 and 814 of FIG. 11 (for example, an elastic contact terminal) of the PCB 810 of the second peripheral device 800 may be exposed. When the third peripheral device 900 is additionally coupled, the terminals 813 and 814 of FIG. 11 of the second peripheral device 800 may electrically and elastically press the speaker terminals 921 of the third peripheral device 900 of FIG. 12 and the antenna terminals 931 of FIG. 12. The cable 508 may electrically connect the RF switch 503-3 of the main circuit substrate 500 and the PCB 810 of the second peripheral device 800. The cable 508 may pass between the battery receiving hole 316-1 of the bracket 310 and the border. The cable 508 does not overlap an electrical connection path between the FPCBs 630 and 830 of the first and second peripheral devices 600 and 800 and the extension part 530 of the main circuit substrate 500, thereby preventing the deterioration of communication performance (for example, antenna performance) using the antenna radiator 930 of the third peripheral device 800 to be coupled later.

According to various embodiments, an electronic device (for example, the electronic device 200) may include a mounting plate for component mounting (for example, the bracket 310), a first component (for example, the stylus 70) and a second component (for example, the battery 416) mounted on the mounting plate 310, a substrate (for example, the main circuit substrate 500) mounted on the mounting plate 310 and having a portion mounted between the first component and the second component, and a third component (for example, the press key 611, the touch key 612, the socket 206, the speaker 920, or the antenna radiator 930) electrically connected to the substrate 500 and mounted on the mounting plate 310.

According to various embodiments, the substrate 500 may include the extension part 530 extending and protruding between the first component and the second component and electrically connected to the third component.

According to various embodiments, the extension part 530 of the substrate 500 may include at least one bolt coupling hole 500-3H so as to couple with the mounting plate 310.

According to various embodiments, the extension part 530 of the substrate 500 may include at least one connector (for example, the female connector 530-1C) electrically connected to the third component.

According to various embodiments, the extension part 530 of the substrate 500 may include at least one sensor (for example, the stylus detector 503-1).

According to various embodiments, the extension part 530 of the substrate 500 may include at least one sensor (for example, the stylus detector 503-1) responding to the movement of the first component or the second component.

According to various embodiments, a connection member (for example, the cable 508) electrically connecting the substrate 500 and the third component (for example, the antenna radiator 930) may be further included and may be disposed not overlapping the substrate 500.

According to various embodiments, the third component (for example, the second peripheral device 800) may extend between the first component and the second component and may include an extension part 830 electrically connected to the extension part 530 of the substrate 500.

According to various embodiments, at least a portion of the extension part 630 or 830 of the third component (for example, the first peripheral device 600 or the second peripheral device 800) may overlap the extension part 530 of the substrate 500.

According to various embodiments, the third component (for example, the first peripheral device 600 or the second peripheral device 800) may include at least one electronic component (for example, the press key 611, the touch key 612, the socket 206, the speaker 920, or the antenna radiator 930) disposed in addition to the extension part 630 or 830.

According to various embodiments, the first component (for example, the stylus 70), the second component (for example, the battery 416), and the third component (for example, the press key 611, the touch key 612, the socket 206, the speaker 920, or the antenna radiator 930) may not overlap the substrate 500.

According to various embodiments, the third component may include a plurality of electronic components (for example, the press key 611, the touch key 612, the socket 206, the speaker 920, or the antenna radiator 930) and at least one of the plurality of electronic components may be stacked.

According to various embodiments, the mounting plate 310 includes a first and second side and the first component (for example, the stylus 70), the second component (for example, the battery 416), and the substrate 500 may be disposed on the first side and the third component (for example, the press key 611 and the touch key 612) may be mounted on the second side.

According to various embodiments, the substrate 500 may not extend between and at least one of the first component (for example, the stylus 70), the second component (for example, the battery 416), and the third component (for example, the first peripheral device 600 or the second peripheral device 800) and the border area of the mounting plate 310.

According to various embodiments, the third component may include at least one of the press key 611, the touch key 612, the socket 206, the speaker 920, or the antenna radiator 930.

According to various embodiments, the first component or the second component may include at least one an input device (for example, the stylus 70), an input device (for example, the speaker 920), and a storage device (for example, a memory), which are electrically connected to the substrate 500.

According to various embodiments, at least one (for example, the stylus 70 or the battery 416) of the first component and the second component may be removed from the mounting plate 310.

According to various embodiments, at least one of the first component and the second component may include the stylus 70 or the battery 416.

According to various embodiments, the first component (for example, the stylus 70), the second component (for example, the battery 416), the substrate 500, and the third component (for example, the socket 206, the speaker 920, or the antenna radiator 930) may be disposed on the first side of the bracket 310, and the display panel 413, the touch panel 412, or the digitizer 414 may be disposed on the second side of the bracket 310.

According to various embodiments, a case (for example, the back case 320 or the battery cover 330) coupled with the mounting plate 310 may be further included, and the first component, the second component, the third component, and the substrate 500 may be interposed between the mounting plate 310 and the case 320 or 330.

An electronic may have a slim appearance and improve the coupling rigidity between structures, with mounted various components (for example, a stylus). For example, a connection path (for example, an extension part of a main circuit substrate) electrically connecting the main circuit substrate and a peripheral device (for example, a sub circuit substrate) may be disposed in a space between a stylus receiving space and a battery receiving space, without being disposed on the border coupling portions between structures. This may provide a slim electronic device while improving space utilization and may improve the degree of freedom for designing the outer appearance (for example, a side or a border). Additionally, a bolt coupling structure between structures may be disposed between a stylus receiving space and a battery receiving space and this may improve the coupling rigidity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the invention has been shown and described with reference to certain embodiments thereof, it will be understood by those skilled in the art that various changes in form and details may be made therein without departing from the ambit of the disclosure as defined by the appended claims. Therefore, the ambit of the disclosure is defined not by the detailed description of the invention but by the appended claims, and all differences within the ambit will be construed as being included in the present disclosure.

What is claimed is:

1. An electronic device comprising:
a mounting plate;
a first component and a second component disposed on the mounting plate;
a substrate disposed on the mounting plate and having a portion disposed between the first component and the second component: and
a third component disposed on the mounting plate and electrically connected to the substrate.

2. The electronic device of claim 1, wherein the substrate comprises a first extension part protruding and extending between the first component and the second component and electrically coupled to the third component.

3. The electronic device of claim 2, wherein the first extension part of the substrate comprises at least one mechanical coupling hole for mechanically coupling with the mounting plate.

4. The electronic device of claim 2, wherein the first extension part of the substrate comprises at least one connector electrically coupled to the third component.

5. The electronic device of claim 2, wherein the first extension part of the substrate comprises at least one sensor.

6. The electronic device of claim 5, wherein the at least one sensor is configured to respond to a movement of the first component or the second component.

7. The electronic device of claim 2, further comprising a connection member electrically coupling the substrate and the third component, wherein the connection member is disposed so that it does not overlap the substrate.

8. The electronic device of claim 2, wherein the third component comprises a second extension part extending between the first component and the second component and electrically coupled to the first extension part of the substrate.

9. The electronic device of claim 8, wherein at least a portion of the second extension part overlaps the first extension part of the substrate.

10. The electronic device of claim 9, wherein the third component comprises at least one electronic component disposed in an area where the extension part of the third component is not disposed.

11. The electronic device of claim 1, wherein the first component, the second component, and the third component do not overlap the substrate.

12. The electronic device of claim 1, wherein the third component comprises a plurality of electronic components and at least one of the plurality of electronic components is stacked on another of the plurality of electronic components.

13. The electronic device of claim 1, wherein
the mounting plate has a first side and a second side;
the first component, the second component, and the substrate are disposed on the first side; and
the third component is disposed on the second side.

14. The electronic device of claim 1, wherein the substrate does not extend between at least one of the first component, the second component, and the third component and a border area of the mounting plate.

15. The electronic device of claim 1, wherein the third component comprises at least one of a press key, a touch key, a socket, a speaker, and an antenna radiator.

16. The electronic device of claim 1, wherein the first component or the second component comprises at least one of an input device, an output device, and a storage device, which are electrically connected to the substrate.

17. The electronic device of claim 1, wherein at least one of the first component and the second component is detachable from the mounting plate.

18. The electronic device of claim 1, wherein at least one of the first component and the second component comprises a stylus or a battery.

19. The electronic device of claim 1, further comprising a display panel, a touch panel, or a digitizer, electrically coupled to the substrate, wherein:
the mounting plate has a first side and a second side;
the first component, the second component, the substrate, and the third component are disposed on the first side; and
the display panel, the touch panel, or the digitizer is disposed on the second side.

20. The electronic device of claim 1, further comprising a case coupled with the mounting plate, wherein the first component, the second component, the third component, and the substrate are interposed between the mounting plate and the case.

21. An electronic device comprising:
a mounting plate configured to allow mounting of at least one component;
a back case coupled with at least a bottom of the mounting plate;
a battery cover coupled with the back case;
a main circuit substrate disposed between the mounting plate and the back case;
a stylus groove formed in the mounting plate;
a battery groove formed in the mounting plate;
a sub circuit substrate disposed between the mounting plate and the back case and electrically coupled to the main circuit substrate; and
a first connector electrically coupling the main circuit substrate and the sub circuit substrate,
wherein:
the main circuit substrate, the stylus groove, the battery groove, and the sub circuit substrate do not overlap each other,
the main circuit substrate comprises an extension part extending between the stylus groove and the battery groove,
the extension part includes at least one second connector electrically coupled to the sub circuit substrate and at least one mechanical coupling hole to mechanically couple with the mounting plate and the back case.

* * * * *